US011225388B2

(12) United States Patent
Quist

(10) Patent No.: US 11,225,388 B2
(45) Date of Patent: Jan. 18, 2022

(54) APPARATUSES AND METHODS FOR UNLOADING PARTICULATE MATERIAL FROM A BOTTOM DISCHARGE CHUTE OF A SOURCE RECEPTACLE TO AN ELEVATED INLET OF A DESTINATION RECEPTACLE

(71) Applicant: Quasar Farms (1980) Ltd., Marwayne (CA)

(72) Inventor: Paul Theodore Quist, Marwayne (CA)

(73) Assignee: Quasar Farms (198) Ltd., Marwayne (CA)

( * ) Notice: Subject to any disclaimer, the term of this patent is extended or adjusted under 35 U.S.C. 154(b) by 188 days.

(21) Appl. No.: 16/378,763

(22) Filed: Apr. 9, 2019

(65) Prior Publication Data

US 2019/0308830 A1 Oct. 10, 2019

Related U.S. Application Data

(60) Provisional application No. 62/747,960, filed on Oct. 19, 2018, provisional application No. 62/654,979, filed on Apr. 9, 2018.

(51) Int. Cl.
*B65G 67/24* (2006.01)

(52) U.S. Cl.
CPC ........ *B65G 67/24* (2013.01); *B65G 2201/042* (2013.01)

(58) Field of Classification Search
CPC ...... B65G 33/32; B65G 47/20; B65G 41/002; B65G 41/005; B65G 41/006; B65G 41/008; A01C 15/003

USPC ................. 198/581, 315, 666, 668
See application file for complete search history.

(56) References Cited

U.S. PATENT DOCUMENTS

| 3,876,055 | A | * | 4/1975 | Tyznik | A01C 3/066 198/522 |
| 5,234,094 | A | * | 8/1993 | Weyermann | B65G 65/28 198/303 |
| 5,515,961 | A | * | 5/1996 | Murphy | B65G 41/008 198/302 |
| 6,283,269 | B1 | * | 9/2001 | Mayer | B65G 41/005 198/313 |
| 7,428,956 | B2 | * | 9/2008 | Scherman | B65G 33/32 198/312 |

(Continued)

*Primary Examiner* — Mark C Hageman
(74) *Attorney, Agent, or Firm* — Kyle R Satterthwait; Ryan W Dupuis; Ade & Company Inc

(57) ABSTRACT

A swing auger towable by a tractor features a main auger, and a feed auger pivotally coupled to the main auger and reaching transversely outward therefrom. One or more additional conveyors each are positioned alongside the tractor with the discharge of the conveyor(s) feeding into the feed auger, and with the conveyor hopper positioned longitudinally forward of the tractor under the bottom discharge of the trailer or other source receptacle. A stabilizing device for the main auger doubles as a lift arm for elevating the conveyor in a transport position, and may be installed with a tandem axle that compensates for angular frame variation in the working position of the main auger. Alternatively, a novel auger frame is pivotally coupled to the inlet end of the main auger, remains at a consistent angle regardless of the main auger's position, and is equipped with a hitch connector and rear stabilizer arms.

26 Claims, 18 Drawing Sheets

(56) References Cited

U.S. PATENT DOCUMENTS

| | | | | |
|---|---|---|---|---|
| 8,584,827 | B1* | 11/2013 | Jesse | B65G 41/008 |
| | | | | 198/315 |
| 9,932,178 | B2* | 4/2018 | Allensworth | B60S 9/04 |
| 10,196,215 | B2* | 2/2019 | Buckmeier | B65G 41/002 |
| 10,717,601 | B2* | 7/2020 | Kornelsen | B65G 21/10 |
| 2014/0086721 | A1* | 3/2014 | Wehrle | B65G 67/24 |
| | | | | 414/809 |
| 2015/0237803 | A1* | 8/2015 | Hilvers | B65G 41/008 |
| | | | | 414/332 |
| 2017/0334650 | A1* | 11/2017 | Buckmeier | B65G 41/008 |

* cited by examiner

45

45

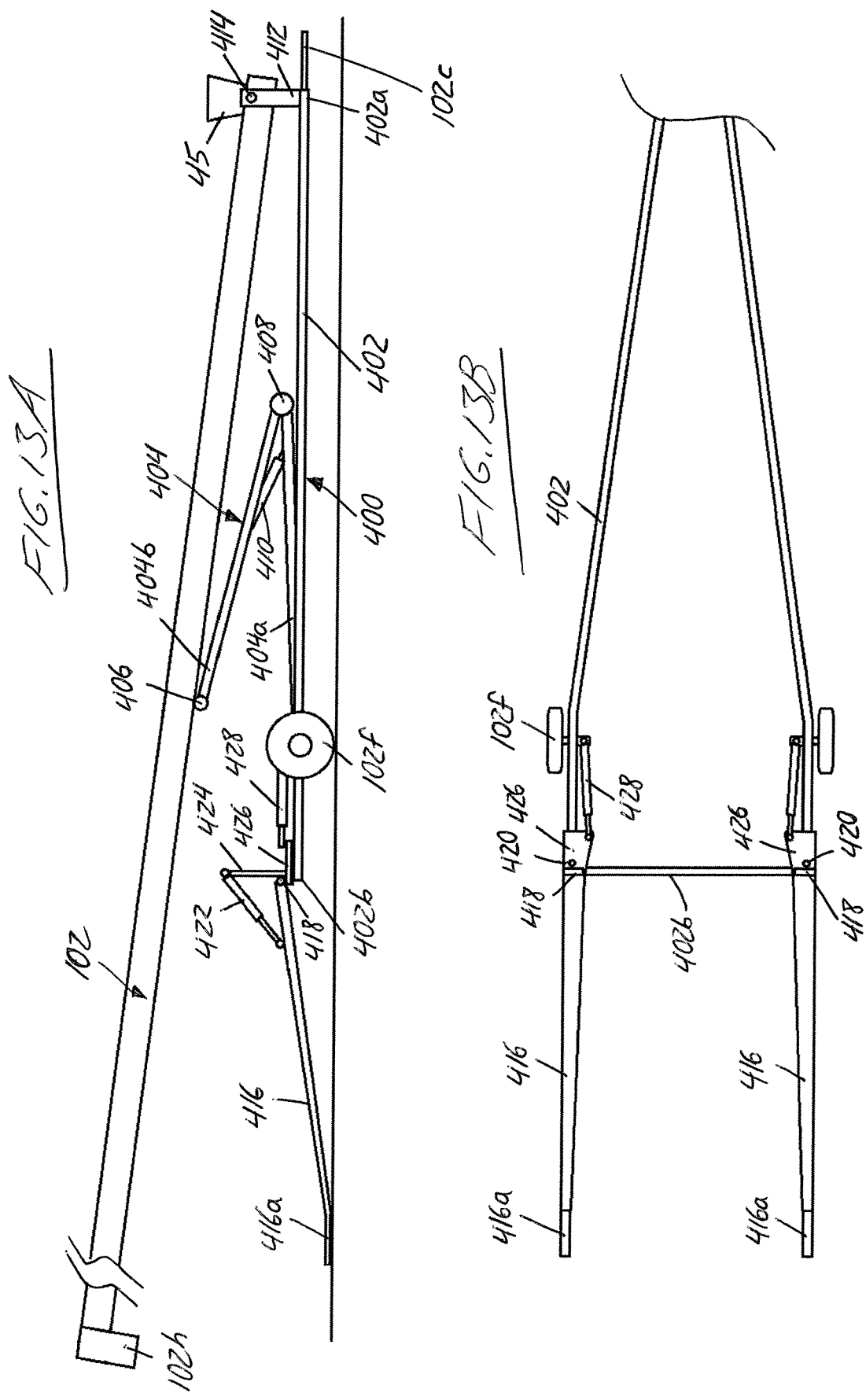

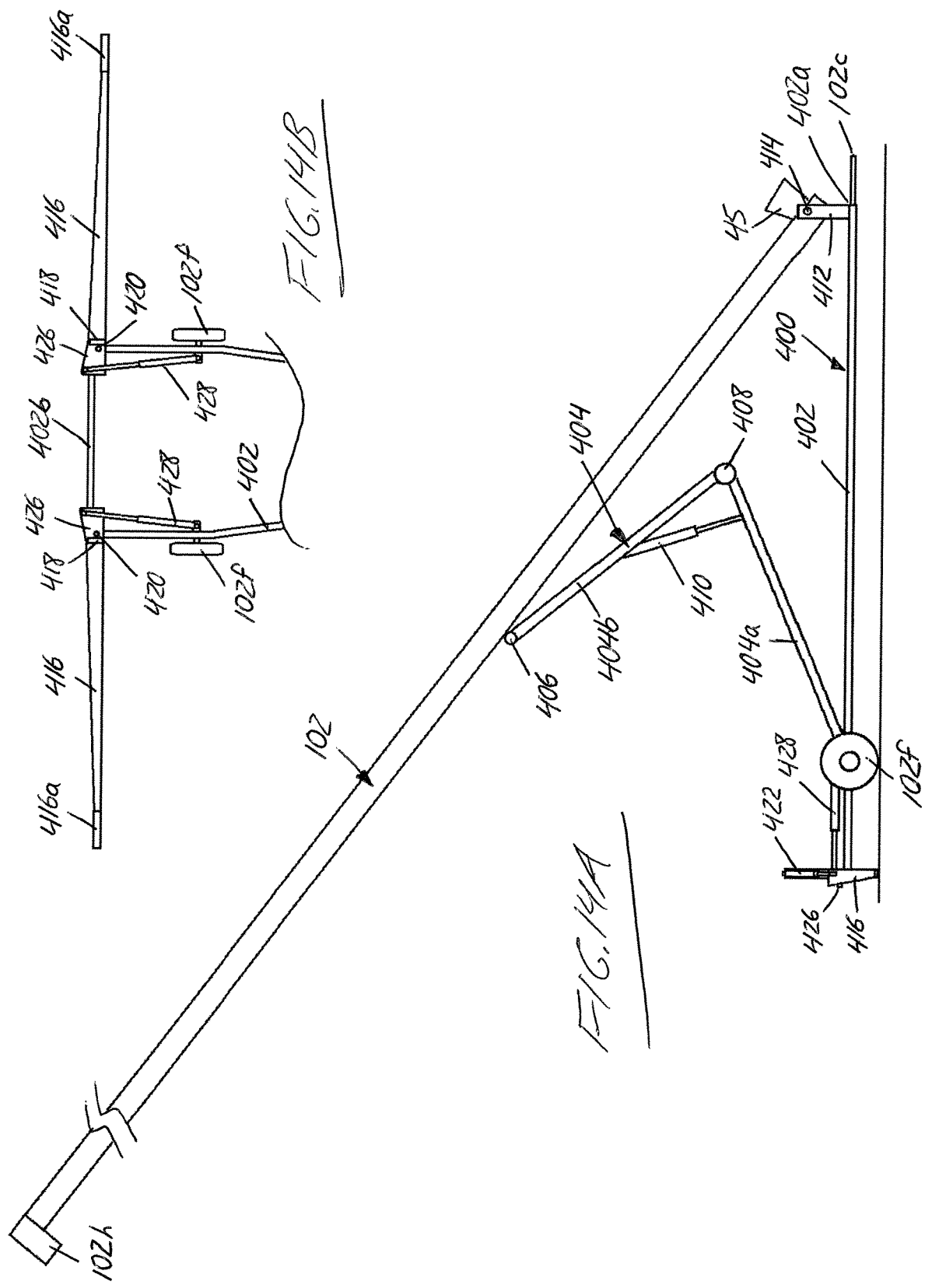

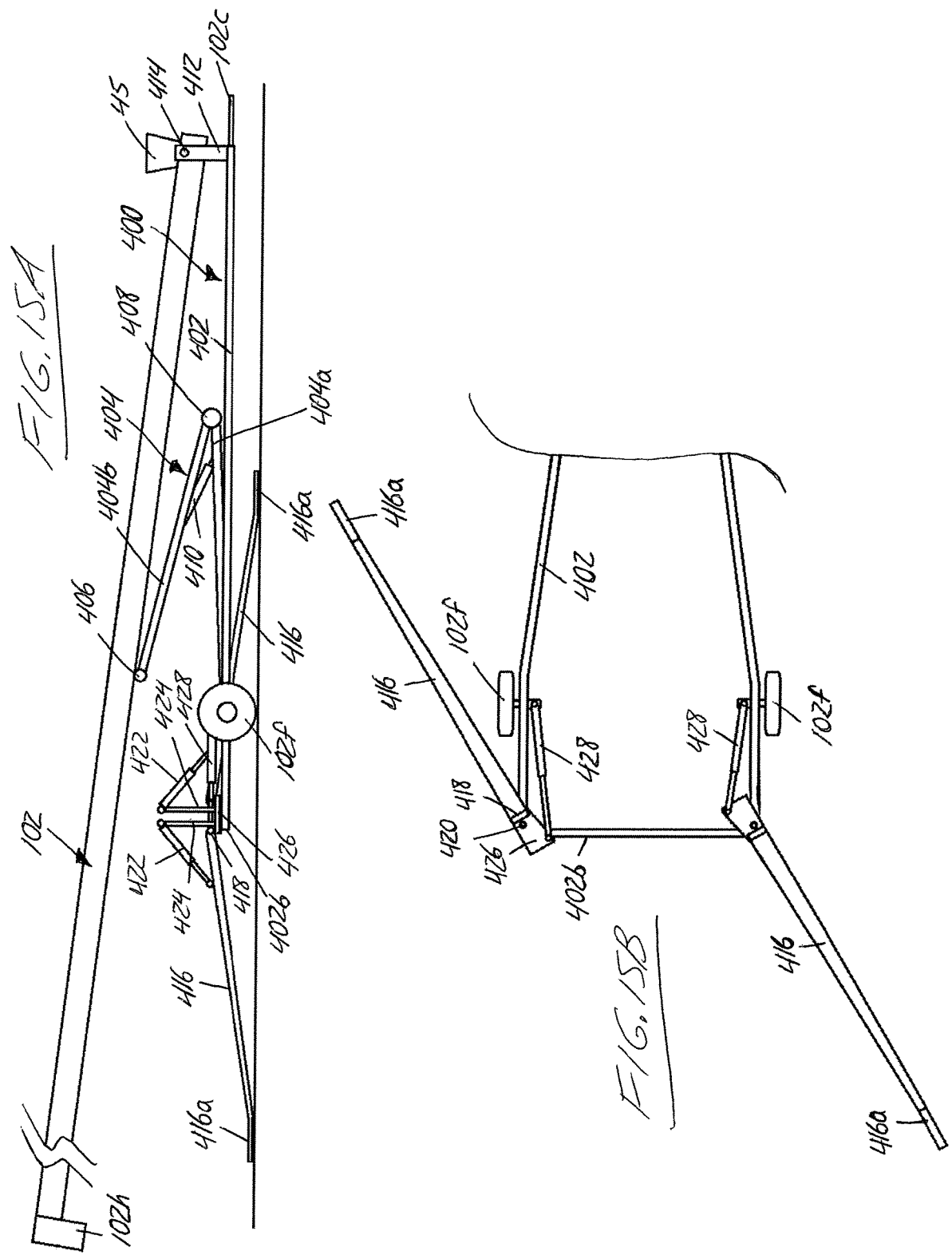

APPARATUSES AND METHODS FOR UNLOADING PARTICULATE MATERIAL FROM A BOTTOM DISCHARGE CHUTE OF A SOURCE RECEPTACLE TO AN ELEVATED INLET OF A DESTINATION RECEPTACLE

CROSS-REFERENCE TO RELATED APPLICATIONS

This application claims benefit under 35 U.S.C. 119(e) of U.S. Provisional Patent Application No. 62/654,979, filed Apr. 9, 2018, and U.S. Provisional Patent Application No. 62/747,960, filed Oct. 19, 2018, each of which is incorporated herein by reference in its entirety.

FIELD OF THE INVENTION

The present invention relates to handling particulate material such as grain, and more particularly to apparatuses and methods for unloading particulate material from a bottom discharge chute of a source receptacle such as a trailer or a hopper bin, into the elevated inlet of a silo or other destination receptacle via a swing auger.

BACKGROUND OF THE INVENTION

FIG. 1 shows a conventional arrangement of a swing auger (100) towed by a tractor (112), when transferring grain from a bottom discharge trailer (108) to a silo (114). A typical swing auger (100), such as that described in U.S. Pat. No. 4,603,775 to Plett, includes a wheeled frame attached to a main auger (102), which in turn is connected to a pivotable feed auger (104) with an associated hopper (106). The typical trailer (108) may be about 25 to 60 feet long, and have one or more bottom-discharge chutes (110a, 110b) located about 2 feet (0.6 meters) above ground level. Two such trailers (108) may be linked in tandem and towed by a semi-truck, in a "Super B" configuration.

In use, the tractor (112) is positioned so that the main auger (102) reaches the top door of the silo (114). The semi-truck then reverses the trailer (108) into position beside, and at an angle to, the tractor (112) so that the feed auger hopper (106) can pivot into position directly beneath one of the discharge chutes (110a). This is critical to preventing spillage of grain. However, this is also challenging, time consuming, and potentially hazardous because the typical feed auger (104) has a reach of only about 10 feet (3.0 meters), rearward visibility from the trailer (108) is limited, and the large trailer (108) must be precisely maneuvered near the swing auger (100), the tractor (112), and the silo (114). Once the trailer (108) is in position, the feed auger (104) is pivoted away from the main auger (102) so that the feed auger hopper (106) is positioned beneath one of the discharge chutes (110a), and receives grain from that discharge chute (110a). A substantial amount of time may be required to unload a large trailer (108).

U.S. Pat. No. 7,428,956 discloses an improved swing auger in which the feed auger is constrained to pivotal motion about a singular axis, and a third auger is pivotably coupled to the feed auger at an inlet end thereof opposite the main auger, instead of the feed auger hopper usually located at this end of the feed auger. The third auger is pivotal about both an upright axis and a horizontal axis, and is equipped with a loading hopper at its inlet end opposite the feed auger. While this design provides the loading hopper with an improved range of motion compared to a conventional swing auger, there remains room for further improvement.

SUMMARY OF THE INVENTION

The present invention includes apparatuses that can be used with a source receptacle, such as a trailer or a hopper bin, having at least one bottom discharge chute, and such apparatuses can be used with, or incorporated into, a swing auger that includes a main auger and pivotable feed auger with a feed auger hopper. The main auger defines a horizontal longitudinal direction along its length, and a horizontal transverse direction perpendicular to the longitudinal direction. In its working position, the main auger resides at an obliquely inclined angle, and so it will be appreciated that the "horizontal longitudinal direction" refers to a projection of the main auger's lengthwise axis into a horizontal reference plane from the inclined plane in which the main auger resides in this working position.

In one aspect, the present invention provides an apparatus for unloading particulate material, such as grain, from the at least one discharge chute of the source receptacle to the feed auger hopper of the swing auger. The apparatus includes a wheeled frame and at least one conveyor mounted thereon. Each conveyor extends from a conveyor hopper for receiving particulate material from the discharge chute of the source receptacle, to a discharge end for discharging particulate material to the feed auger hopper of the swing auger.

In some embodiments of the apparatus, the wheeled frame is adapted for attachment to a tractor that tows the swing auger, so that the wheeled frame moves in unison with the tractor. When the wheeled frame is attached to the tractor, the conveyor is positioned transversely beside the tractor, and extends longitudinally forward from the feed auger hopper, and may be substantially parallel to the main auger and the tractor.

In other embodiments of the apparatus, the apparatus includes a prime mover onboard the wheeled frame, so that the wheeled frame can be positioned (with or without the need for a tractor) with the conveyor extending longitudinally forward from the feed auger hopper, and may be substantially parallel to the main auger.

In some embodiments of the apparatus, the at least one conveyor includes two conveyors. Each of the conveyor hoppers is independently movable relative to the wheeled frame to move longitudinally forward from a retracted position to an extended position in which the conveyor hoppers are positioned beneath different discharge chutes of the source receptacle. In embodiments of the apparatus, each of the conveyor hoppers may be independently moveable vertically, relative to the wheeled frame, so as to position the conveyor hoppers vertically near the discharge chutes. Further, each of the conveyor hoppers may be independently movable transversely, relative to the wheeled frame, to vary a transverse distance between the conveyor hoppers so that they may simultaneously receive particulate material from transversely spaced apart discharge chutes.

In some embodiments of the apparatus, the apparatus may include a mechanism (e.g., a hydraulic cylinder, or a roller chain drive) for actuating movement of the conveyor hoppers from their retracted positions to their extended positions.

In some embodiments of the apparatus, the feed auger hopper may be attached to the wheeled frame. In one embodiment, a first member (e.g., an evener bar) extends from a first end pivotally attached to the wheeled frame to a second end pivotally attached to the conveyors. A second member (e.g., a drawbar) extends from a first end pivotally attached to the feed auger hopper, to a second end pivotally attached to the first member (e.g., the evener bar) between its first and second ends. In other embodiments of the apparatus, the feed auger hopper may be mounted on the wheeled frame.

In another aspect, the present invention comprises a method for unloading particulate material, such as grain, from the at least one discharge chute of the source receptacle to the feed auger hopper of the swing auger. The method includes the steps of:

(a) providing a wheeled frame with at least one conveyor mounted thereon, wherein each conveyor extends from a conveyor hopper for receiving particulate material from one of the at least one discharge chute of the source receptacle, to a discharge end for discharging particulate material to the feed auger hopper of the swing auger;

(b) positioning the at least one conveyor such that the discharge end is in communication with the feed auger hopper, and the conveyor extends longitudinally forward from the discharge end to the conveyor hopper, (and may be substantially parallel to the main auger), and the discharge chute of the source receptacle is longitudinally in front of the wheeled frame; and (c) positioning the at least one conveyor hopper beneath the discharge chute of the source receptacle by moving the conveyor hopper longitudinally forward relative to the wheeled frame.

In some embodiments of the method, the step of positioning the at least one conveyor involves attaching the wheeled frame to a tractor towing the swing auger, such that the conveyor is positioned transversely beside the tractor, and extends substantially parallel to the tractor. In other embodiments of the method, the step of positioning the at least one conveyor involves moving the wheeled frame independently of the tractor using a prime mover onboard the wheeled frame.

In some embodiments of the method, the at least one discharge chute includes two discharge chutes, and the at least one conveyor includes two conveyors. In such embodiments of the method, the step of positioning the at least one conveyor hopper involves independently positioning each conveyor hopper beneath a different one of the discharge chutes. The step of positioning the conveyor hoppers may further involve independently moving the conveyor hoppers vertically, relative to the wheeled frame, to move the conveyor hoppers vertically in relation in the discharge chutes. The step of positioning the conveyor hoppers may further involve independently moving the conveyor hoppers transversely, relative to the wheeled frame, to vary a transverse distance between the conveyor hoppers to match a transverse distance between the discharge chutes.

In another aspect, the present invention provides a system for unloading particulate material from a bottom discharge of a trailer or other source receptacle and transferring said particulate material to a silo or other destination receptacle, said system comprising: a tractor; a swing auger towable by said tractor at a rear end thereof, and comprising a main auger positionable in a working position reaching rearwardly and upwardly from the tractor, and a feed auger pivotally coupled to the main auger and positionable in a working position spanning transversely outward from said main auger; and an unloading apparatus comprising at least one conveyor having a conveyor hopper at one end thereof and a discharge at a second opposing end thereof, said conveyor being positionable in a working position running longitudinally of said tractor along one side thereof with the discharge of the conveyor in feeding relation to an input end of the feed auger, and with the conveyor hopper of the conveyor positioned longitudinally forward of the tractor to reside under the bottom discharge of the trailer or other source receptacle.

In another aspect, the present invention provides an apparatus for unloading particulate material, such as grain, from the at least one discharge chute of the source receptacle to a silo or other destination receptacle. The apparatus includes a swing auger having a main auger extending in a longitudinal direction and connectable to a tractor for towed transport, a feed auger pivotably coupled to the main auger and a conveyor pivotably attached to a receiving end of the feed auger. The conveyor extends from a conveyor hopper for receiving particulate material from the discharge chute of the source receptacle, to a discharge end for discharging particulate material to the feed auger. The apparatus is further characterized by inclusion of at least one of the following features: (a) a set of driven wheels provided on the feed auger at or proximate said pivotal connection between the conveyor and the feed auger; (b) on the conveyor hopper, two sets of driven wheels that are respectively operable in engagement with the ground to move the conveyor hopper in different respective directions; and/or (c) arrangement of the conveyor and the feed auger to be positionable in a transport position reaching longitudinally rearward from where the feed auger connects to the main auger.

In some embodiments of the apparatus, the feed auger and conveyor, in the transport position, are lifted off the ground by a lifting means.

In another aspect, the present invention provides an auger with a stabilizing device for stabilizing a main auger and main auger frame of said auger. The device includes at least one stabilizing arm that is pivotably mounted to the main auger frame in a manner configured to selectively engage with the ground to thereby enhance the stability of the main auger frame. The device also includes at least one actuator for selectively lifting the at least one stabilizing arm from the ground into a disengaged state therefrom, and forcing the at least one stabilizing arm downwardly against the ground into an engaged state therewith.

In one embodiment, the main auger comprises a front inlet end and an opposing rear discharge end; the main auger frame comprises a wheeled front frame section having a front end pivotally coupled to the main auger, a set of auger frame tires rotatably installed on the front frame section adjacent an opposing rear end thereof, and a rear frame section pivotally coupled between the front frame section and the main auger and movable between raised and lowered positions such that raising of said rear frame section lifts the rear discharge end of the main auger, and lowering of said rear frame section lowers the rear discharge end of the main auger; and the at least one stabilizer arm is pivotally coupled to the front frame section.

Preferably, the at least one stabilizer arm comprises at least one rear stabilizer arm mounted the front frame section proximate the rear end thereof.

Preferably, the at least one rear stabilizer arm is deployable into the engaged state in a rearwardly-reaching position extending rearwardly from the front frame section.

Preferably, the at least one stabilizer arm comprises a pair of stabilizer arms deployable into the engaged state in laterally-reaching positions extending transversely outward from the main auger frame on opposite sides thereof.

Preferably, the at least one stabilizer arm comprises at least one angularly adjustable arm movable about an upright axis to adjust a direction in which the adjustable arm reaches outwardly from the main auger frame to engage the ground.

Preferably, the at least one angularly adjustable arm comprises two angularly adjustable arms situated at or adjacent opposite sides of the main auger frame.

Preferably, the at least one angularly adjustable arm is movable about said upright axis between a plurality of positions, including at least two of: (i) a rearwardly-reaching position extending rearwardly from a connection of said angularly adjustable arm to the main auger frame; (ii) a laterally-reaching position extending transversely outward from the main auger frame; and (iii) a forwardly-reaching position extending forwardly from a connection of said angularly adjustable arm to the main auger frame.

Preferably, the at least one angularly adjustable arm is movable between at least said rearwardly-reaching position and said laterally-reaching position.

Preferably, the at least one angularly adjustable arm is movable between at least said rearwardly-reaching position and said forwardly-reaching position.

More preferably, the at least one angularly adjustable arm is movable between all three of the rearwardly-reaching, laterally-reaching, and forwardly-reaching positions.

Preferably, the at least one angularly adjustable arm comprises a pair of angularly adjustable arms that are movable independently of one another between said at least two positions, and are operable to apply different respective down pressures to the ground in the engaged state therewith.

Preferably, the auger is a swing auger that, in addition to the main auger, comprises a feed auger having a pivotal connection to the main auger, and the front frame section is pivotally coupled to the main auger beneath the pivotal connection between the feed auger and the main auger.

Preferably, a distance from the front inlet end of the main auger to the auger frame tires is a fixed distance that remains static during movement of the rear frame section between the raised and lowered positions.

Preferably, the auger comprises a hitch connector by which the auger is connectable to a tractor hitch, and said hitch connector is mounted to the front frame section of the main auger frame.

In another aspect, the present invention provides at least one oscillating tandem axle assembly that carries the at least one stabilizing arm of the stabilizing device thereon, and is operable to enable said stabilizing device to be level with the ground irrespective of angular changes occurring as the main auger frame is manipulated to raise or lower the main auger.

In yet another aspect, the present invention provides an auger comprising a main auger; and a main auger frame on which the main auger is carried, said main auger frame comprising a wheeled front frame section having auger frame tires rotatably mounted thereon for rolling support of the main auger frame, and a rear frame section movably coupled to the wheeled front frame section and movable from a lowered position to a raised position to transition the main auger between a lowered state for storage and transport, and raised state in which a discharge end of the main auger is elevated to enable discharge into an elevated inlet of a destination receptacle; wherein the auger is further characterized by one or more of the following features: (a) the front frame section is pivotally coupled to the main auger at or closely adjacent a front inlet end thereof; (b) the auger is a swing auger further comprising a feed auger pivotally coupled to the main auger, and the front frame section is pivotally coupled to the main auger beneath a location at which the feed auger is coupled thereto; (c) the auger comprises a hitch connector attached to the front frame section at a front end thereof; (d) a distance from the front inlet end of the main auger to auger frame tires of the wheeled front frame section is a fixed distance that remains static during movement of the rear frame section between the raised and lowered positions; and (e) the front frame section has rear stabilizer arms that are mounted thereon at or proximate a rear end of said front from section, and are lowerable into pressure-applying engagement with the ground, and raiseable into a disengaged state therefrom.

BRIEF DESCRIPTION OF THE DRAWINGS

In the drawings shown in the specification, like elements may be assigned like reference numerals. The drawings are not necessarily to scale, with the emphasis instead placed upon the principles of the present invention. Additionally, each of the embodiments depicted are but one of a number of possible arrangements utilizing the fundamental concepts of the present invention.

FIG. 13A shows a side elevational view of a swing auger having an inventive frame design according to another embodiment of the present invention, and shows the swing auger in a parked position with its main auger lowered, and with rear stabilizing arms of the novel frame deployed rearwardly therefrom to stabilize the parked auger.

FIG. 13B shows an overhead view of a front frame section of the inventive auger frame of FIG. 13A, and the two rearwardly deployed stabilizer arms thereof.

FIG. 14A shows a side elevational view of the swing auger of FIG. 13, but in a working position with its main auger raised and the two rear stabilizer arms deployed laterally outward from the inventive frame to stabilize the raised main auger and enable tilt-based aiming of the main auger's discharge end through differential operation of the two stabilizer arms.

FIG. 14B shows an overhead view of the front frame section of the inventive auger frame of FIG. 14A, and the two laterally deployed stabilizer arms thereof.

FIG. 15A shows a side elevational view of the swing auger of FIG. 13 in a stage of transition from the parked condition of FIG. 13A into a hitched condition connected to a tractor for towing, during which the two rear stabilizer arms are deployed in opposing forward and rearward directions to enable height adjustment of the auger's hitch connector.

15B shows an overhead view of the front frame section of the inventive auger frame of FIG. 15A, and the two oppositely deployed stabilizer arms thereof.

DETAILED DESCRIPTION OF EMBODIMENTS OF THE INVENTION

Definitions. Any term or expression not expressly defined herein shall have its commonly accepted definition understood by a person skilled in the art. As used herein, the following terms shall have the following meanings.

"Particulate material" refers to any material that is conveyable in bulk as a collection of particles. In an exemplary use, particulate material may include "grain", which refers to any agricultural crop in particulate form, non-limiting examples of which include cereal seeds (e.g., wheat, spelt, barley, oat, rice, corn), pulses or legumes (e.g., peas and beans), and oilseeds (e.g., canola seeds). The present invention is not limited by any particular type of crop. In other exemplary uses, particulate material may include non-crop matter, a non-limiting example of which includes fertilizer particles.

"Conveyor" refers to any mechanism that can transfer particulate material in a path between two points. Non-limiting examples of conveyors include auger mechanisms that include a rotatable flighted auger within a tube, air mechanisms that include an air pump to create an airflow to carry particulate material within a tube, and conveyor belt mechanisms that use a drive mechanism and rotating pulleys or rollers to move a belt in a loop.

"Swing auger" refers to an apparatus for moving particulate material that has a main auger and a feed auger that transfers particulate material into the main auger, wherein the feed auger is pivotable relative to the main auger.

"Longitudinal" refers to the horizontal direction substantially parallel to the longitudinal axis of the main auger of a swing auger when projected into a horizontal reference plane from the normally inclined plane of the main auger's working position, while "transverse" refers to the horizontal direction substantially perpendicular to the "longitudinal" direction.

Figure 1:
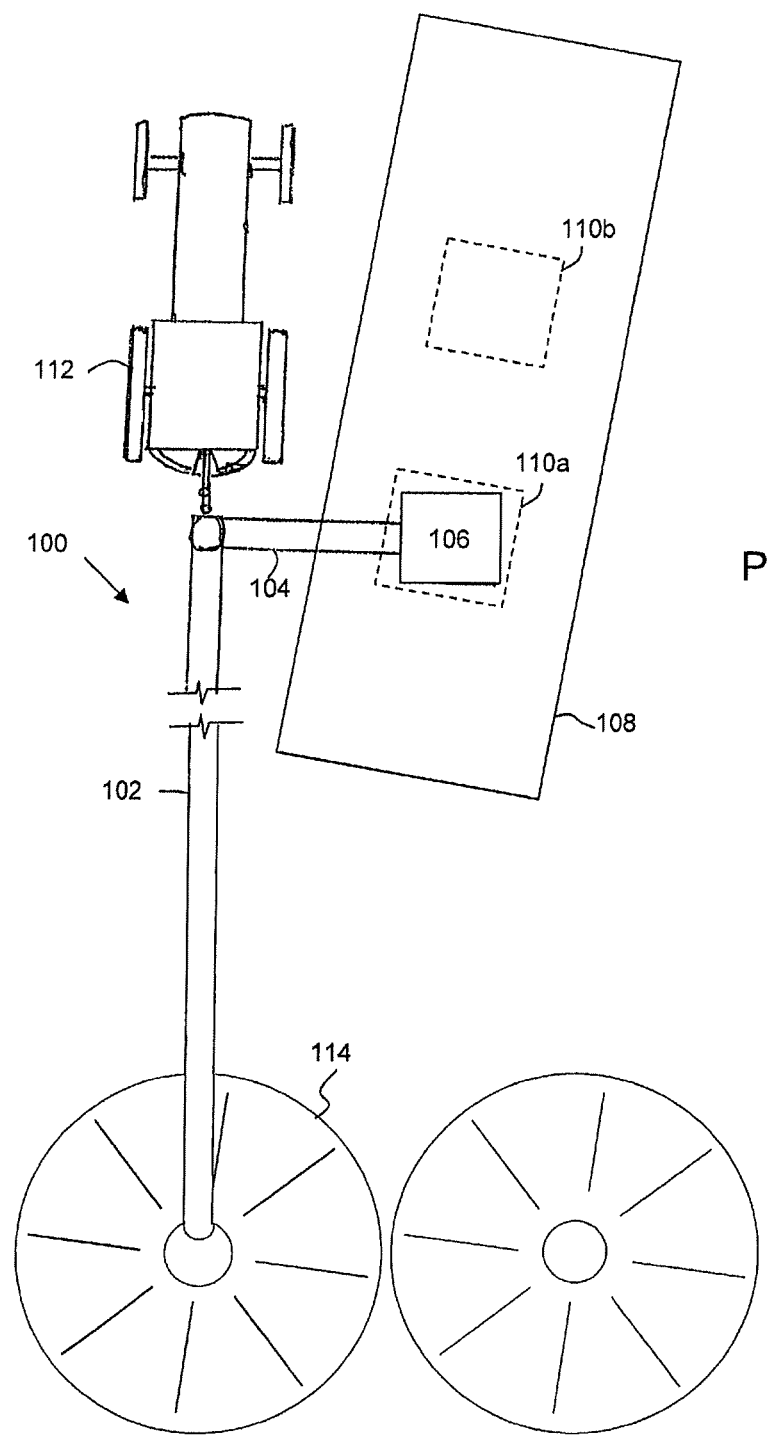
FIG. 1 shows a top plan view of a conventional arrangement of a swing auger towed by a tractor, when transferring grain from a trailer to a silo.
Figure 2:
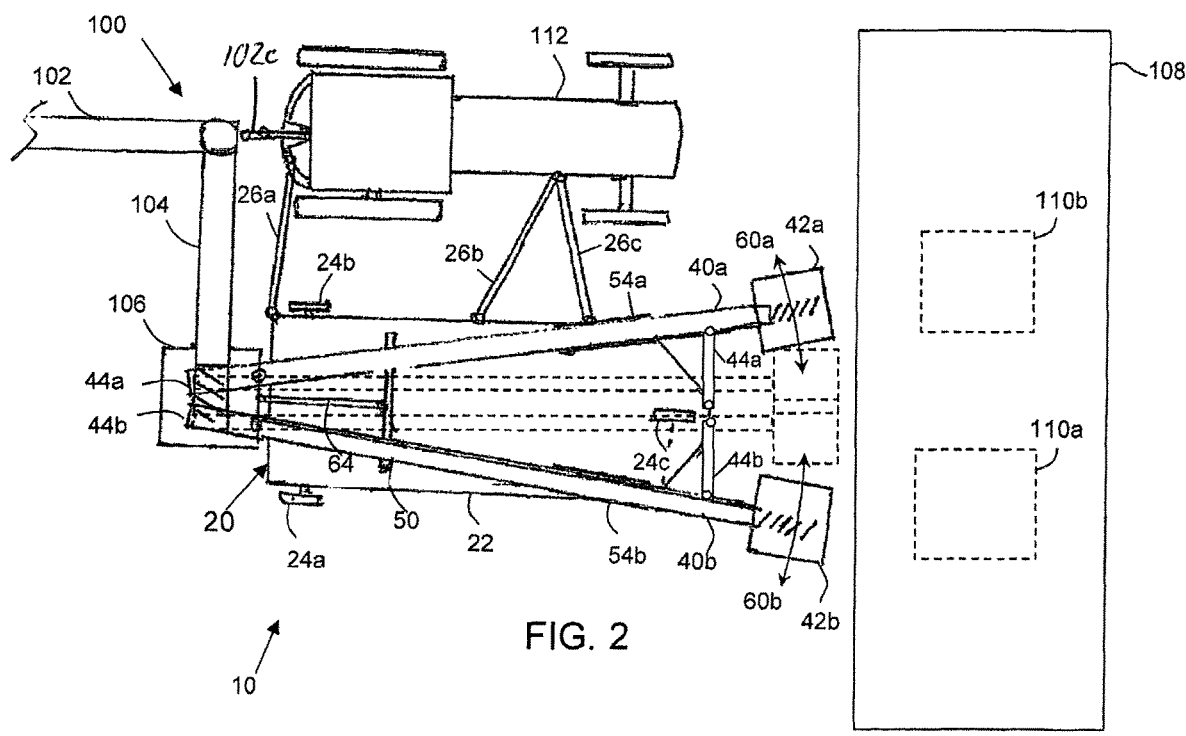
FIG. 2 shows a top plan view of a first embodiment of an apparatus according to the present invention, in relation to a tractor towing a swing auger, when the apparatus is in a retracted position.
Figure 3:
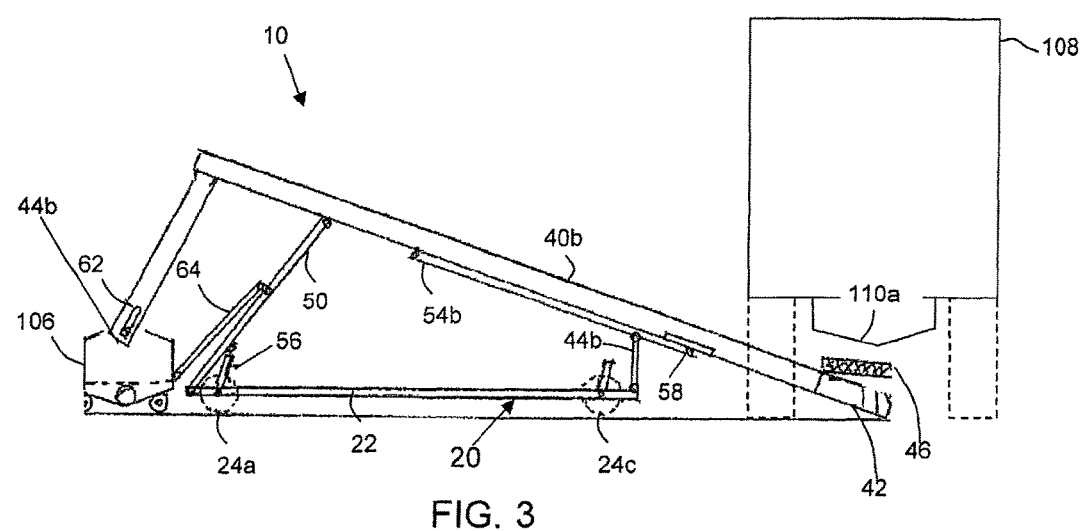
FIG. 3 shows a side elevation view of the apparatus of FIG. 2, in relation to a feed auger hopper, when the apparatus is in an extended position.
Figure 4:
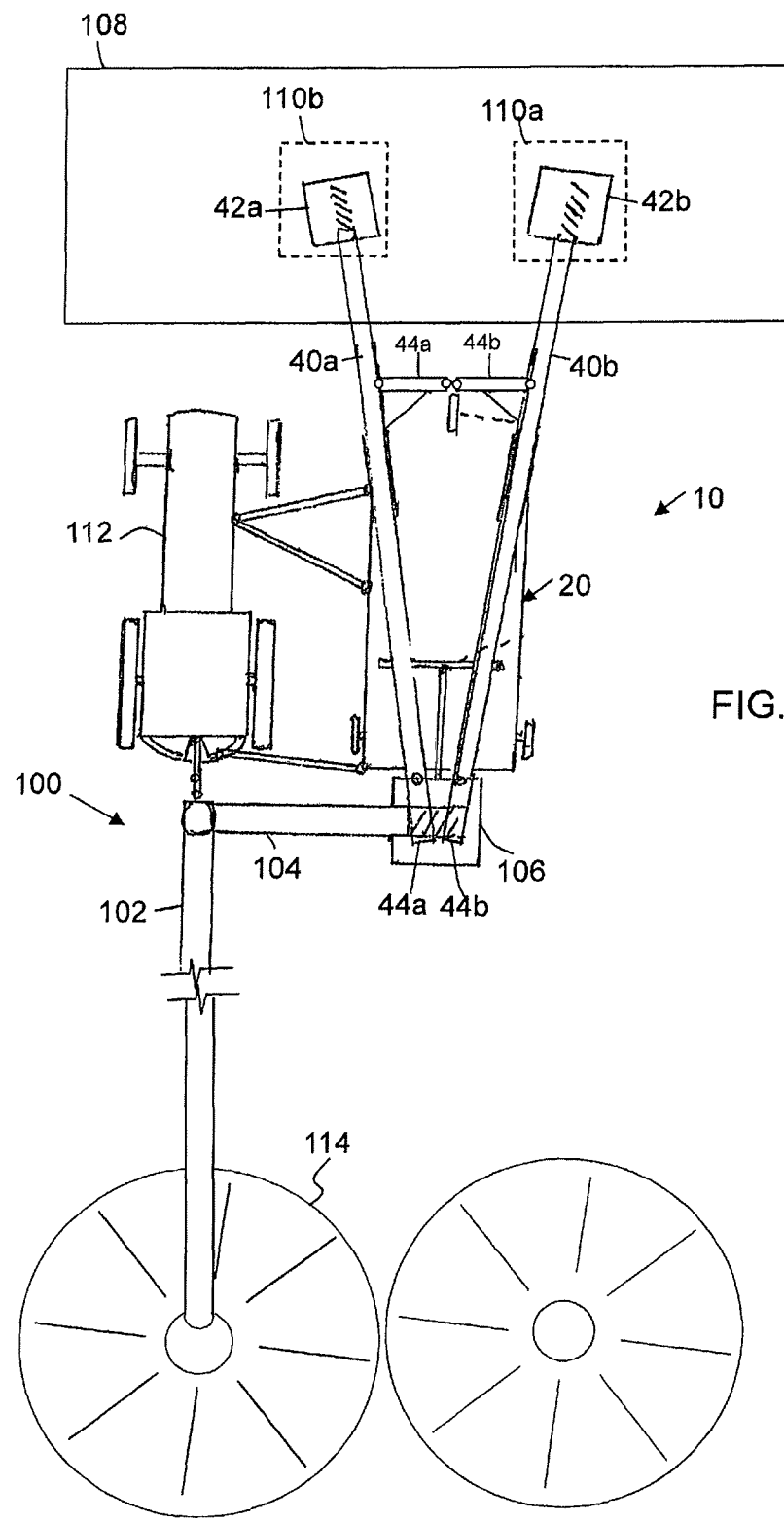
FIG. 4 shows a top plan view of the apparatus of FIG. 2, when in an extended position for unloading grain from a trailer to a swing auger towed by a tractor, which transfers grain to a silo.

FIGS. 2 to 4 show a first embodiment of an apparatus (10) according to the present invention. In general, the apparatus (10) includes a wheeled frame (20) and at least one conveyor (40a, 40b) mounted on the frame (20). These and other components of the apparatus (10), and their use and operation are described in greater detail below.

The wheeled frame (20) supports the conveyors (40) and allows the conveyors (40) to be readily moved from one location to another in rolling fashion atop the underlying ground surface. In one embodiment, as shown in FIGS. 2 to 4, the wheeled frame (20) is provided by a dolly having a platform (22) supported on three wheels (24). The rear wheels (24a, 24b) are spaced apart for stability, while the front wheel (24c) is substantially aligned with the centerline of the platform (22) and attached thereto with a swiveling caster to allow the wheeled frame (20) to turn as the tractor (112) turns. In other embodiments, the wheeled frame (20) may have a different shape, and a different number and configuration of wheels (24).

In one embodiment, as shown in FIGS. 2 to 4, the wheeled frame (20) is adapted for attachment to the tractor (112) such that the conveyors (40) are disposed transversely beside the tractor (112) on a same side thereof, and extend longitudinally forward from the feed auger hopper (106) of a swing auger (100) towed by the tractor (112). Referring to FIG. 2, it can be seen that the conveyors (40) lie in the longitudinal direction and run alongside the tractor on one side thereof. In this embodiment, the wheeled frame (20) is attached to the tractor (112) by three rigid arms (26). The rear rigid arm (26a) attaches a rear end of the wheeled frame (20) to a hitch bar attached to the rear of the tractor (112). The intermediate rigid arm (26b) and front rigid arm (26c) attach an intermediate portion and a front end, respectively, of the wheeled frame (20) to the chassis of the tractor (112). In other embodiments, the wheeled frame (20) may be attached to the tractor (112) in different ways.

The apparatus (10) has at least one conveyor (40), and preferably at least two conveyors (40), mounted on the wheeled frame (20) so as to move in unison with the wheeled frame (20) under rolling contact of the wheels (24) with the underlying ground. Each conveyor (40) extends from a conveyor hopper (42) attached to a front end of the conveyor (40), to a rear discharge end (44) situated opposite the conveyor hopper (42). The conveyor hopper (42) receives particulate material discharged from a discharge chute (110) of a trailer (108) or other source receptacle. The conveyor (40) moves the particulate material from the conveyor hopper (42) to the discharge end (44), which discharges the particulate material to the feed auger hopper (106) at the inlet end of the feed auger (104), whose opposing discharge end discharges into the lower front inlet end of the main auger (102) of the swing auger (100). This lower front inlet end of the main auger (102) features a hitch connector (102c) spanning forwardly therefrom to make connection with the towing tractor (112). From this lower front inlet end, the main auger (102) angles upwardly and rearwardly to an opposing upper rear discharge end of the main auger (102) that is aligned over the elevated inlet of the destination receptacle, for example the top door of the silo (114).

In one embodiment, as shown in FIGS. 2 to 4, the apparatus (10) has two conveyors (40). Each conveyor (40) includes a substantially cylindrical tube extending, for example, a length of about 30 feet (about 9.1 meters) from the conveyor hopper (42) to the discharge end (44). This conveyor length is selected to exceed the length of a typical tractor 112, as shown by the FIG. 2 illustration where the conveyor hoppers (42) can be seen to reside longitudinally forward of the tractor (112) beyond the front end thereof, while the rear discharge ends (44) of the conveyors can be seen to resides longitudinally behind the tractor (112) beyond the rear end thereof at which the main auger is towed. The tube of the conveyor (40) is formed by two sections connected together at an articulating joint. The first section is oriented at a rearwardly inclined angle, and comprises the front end of the conveyor (40) at which the conveyor hopper (42) resides, while the second section comprises a downwardly hanging chute that terminates at the discharge end (44). In this embodiment, the first section of the tube contains a flighted auger rotatable therein to move particulate material through the first section from the conveyor hopper (42) to the hanging chute of the second section, where the particulate material falls through the discharge end (44) into the feed auger hopper (106). In other embodiments, the conveyor (40) may include other mechanisms for moving particulate material from the conveyor hopper (42) to the discharge end (44), as described above. In some embodiments, each conveyor hopper (42) may be provided with sides (46) made of rubber or fabric that can be extended vertically upwards (e.g., in an accordion-like manner using a spring loading mechanism) from the conveyor hopper (42) to the discharge chute (110), to prevent spillage of particulate material as it exits the discharge chute (110) towards the conveyor hopper (42). As well, vertically extending splash boards (46) (e.g., about 2 feet or 0.6 meters tall) may be provided on the feed auger hopper (106) to prevent spillage of particulate material as it exits from the discharge end (44) towards the feed auger hopper (106). Further, a control mechanism may be provided to control the operating speed of the conveyor (40) (e.g., the rotational speed of the flighted auger, the pressure created by an air system, or the speed of a conveyor belt) to match the feed rate of the swing auger (100).

Each conveyor hopper (42) can be moved longitudinally forward relative to the frame (20) from a more rearwardly retracted position near the front end of the frame (as shown in FIG. 2) to a more forwardly extended position (as shown in FIGS. 3 and 4) reaching further forward from the frame to reside beneath one of the discharge chutes (110) of a trailer (108) or other source receptacle, and in front of the tractor (112). The conveyor hopper (42) may be movable relative to the frame (20) from the retracted position to the extended position in a variety of ways. As a non-limiting example, as shown in FIG. 3, the conveyors (40) are pivotally attached to the wheeled frame (20) by a T-shaped evener bar (50) mounted near the rear end of the frame, and received by a saddle-shaped member (54) mounted near the front end of the frame. A hydraulic cylinder (56) is pivotally attached to the wheeled frame (20) and to the evener bar (50) such that retraction of the hydraulic cylinder (56) causes forward longitudinal movement of the conveyor hopper (42) (i.e., from left to right in the drawing plane of FIG. 3) beneath the discharge chute (110). The saddle-shaped member (54) is also pivotally attached to the wheeled frame (20), so that the conveyor hopper (42) simultaneously pivots vertically upward toward the discharge chute (110) as the conveyor hopper (42) moves longitudinally forward. In addition or alternative to the hydraulic cylinder (56), the conveyor (40) may be attached to the saddle-shaped member (54) with a roller chain drive mechanism (58), and a motor may be provided to drive the roller chain, and thereby translate the conveyor (40) relative to the saddle-shaped member (54). The required amount of forward longitudinal movement of the conveyor hopper (42) from the retracted position to the extended position will depend on the position of the discharge chute (110) on the trailer (108) or other source receptacle. As a non-limiting example, the amount of forward movement of the conveyor hopper (42) may be about 10 feet (3.0 meters), which is sufficient to reach the discharge chute (110) of a typical trailer, or a typical hopper bin which is about 15 to 18 feet (4.5 to 5.5 meters) in diameter.

Each conveyor hopper (42) may also be independently movable transversely and vertically relative to the frame (20) so that the conveyor hopper (42) can be precisely positioned horizontally beneath and vertically close to a discharge chute (110) of the source receptacle, to avoid spillage of particulate matter as it exits the discharge chute (110). In one embodiment, as shown in FIGS. 2 to 4, each of the conveyors (40) is pivotally mounted to the wheeled frame (20) so as to be pivotable about a vertical axis, and thereby vary the transverse positions of the conveyor hoppers (42) along the arcuate paths (60a, 60b) shown by double-headed arrows in FIG. 2. In this embodiment, the conveyors (40) may be pivoted into a first orientation (as shown in dashed lines in FIG. 2) in which the conveyor hoppers (42) are relatively close together in the transverse direction, and partly overlap each other. In the first orientation, the closely positioned conveyor hoppers (42) can be extended longitudinally forward to receive particulate material discharged from a single discharge chute (110) of a trailer (108) or other source receptacle (e.g., a hopper bin). This first orientation also makes the apparatus (10) relatively compact in the transverse direction for improved maneuverability during transportation. The conveyors (40) can be pivoted away from one another into a second orientation (as shown in solid lines in FIGS. 2 and 4), in which the conveyors (40) are non-parallel and forwardly divergent to one another, and in which the conveyor hoppers (42) are transversely separated from each other to receive particulate material from different, spatially-separated discharge chutes (110a, 110b) of the trailer (108) or other source receptacle. The desired amount of transverse movement of the conveyor hopper (42) will depend on the transverse separation of the discharge chutes (110a, 110b). As a non-limiting example, conveyors (40) having a length of about 30 feet (9.1 meters) may each be pivotable to increase the angular distance between them to about 30 to 40 degrees so that the transverse separation of the conveyor hoppers (42) may be increased to about 8 to 10 feet (about 2.4 to 3.0 meters). The transverse and vertical movement of the conveyor hopper (42) may be implemented by a variety of mechanisms, such as hydraulic or electro-mechanical actuators. For example, one or more hydraulically actuated arms (44a, 44b) may be pivotally attached to the frame (20) and to the conveyors (40a, 40b) to raise and lower the conveyors (40a, 40b) relative to the frame (20), and to push and pull them between the first and second orientations. As another example, a suspension with an adjustable ride height may be used to raise and lower the frame (20) relative to its axles, and thus vary the height of the conveyors (40a, 40b).

The feed auger hopper (106) may be attached to the apparatus (10) to avoid unintentional separation of the conveyor's discharge end (44) from the feed auger hopper (106), and thereby avoid spillage of particulate material as it discharges from the conveyor (40) to the feed auger hopper (106). In one embodiment, as shown in FIGS. 2 to 4, the feed auger hopper (106) is pivotally attached to the discharge end (44) by a pin connection that can pivot and slide within a slot (62) formed in the conveyor (40) at the downwardly hanging chute of the second section thereof. Furthermore, a drawbar (64) is provided with a first end that is pivotally attached to the feed auger hopper (106), and a second end that is pivotally attached to an intermediate portion of the evener bar (50) approximately equidistant from the two ends of the evener bar (50). Accordingly, when the conveyor hopper (42) moves in the longitudinal direction by a certain distance, the feed auger hopper (106) will move only about half that distance in the longitudinal direction. This reduced distance may help to avoid unintended strain on components of the swing auger (100), as well as unintentional separation of the main auger (102) from a top door of a silo (114).

An exemplary use and operation of the embodiment of the apparatus (10) shown in FIGS. 2 to 4 to unload grain from a trailer (108) to a feed auger hopper (106) is now described. Referring to FIG. 2, the tractor (112) is parked in a position so that the main auger (102) extends upward and rearward from the tractor's rear end to the elevated inlet of a destination receptacle (e.g. top door of a silo (114)). In FIG. 2, the feed auger is in a working position reaching transversely outward from the main auger to the same side of the tractor at which the apparatus (10) is disposed. While the feed auger (104) is shown as extending at about 90 degrees to the main auger (102) in a horizontal reference plane, it will be understood that other orientations of the feed auger (104) to the main auger (102) are possible, depending on the dimensions of the apparatus (10) and the swing auger (100). Moreover, in FIG. 2, the frame (20) is shown as being attached to the right side of the tractor (112) (from the perspective of the driver's seat), but it will be understood that the frame (20) may instead be attached to the left side of the tractor (112). The conveyors (40) are pivoted relative to the wheeled frame (20) about a vertical axis so that the conveyor hoppers (42) are transversely separated from each other. A semi-truck (not shown) tows and parks the trailer (108) in front of the wheeled frame (20) and tractor (112) so that each of the trailer's two discharge chutes (110a, 110b) are substantially transversely aligned with a different one of the conveyor hoppers (42). Accordingly, the lengthwise axis of the trailer (108) will be oriented generally transversely, at about 90 degrees, to the longitudinal direction of the main auger (102) and the tractor (112), as illustrated in FIG. 2. However, precise orientation of the trailer (108) is not critical since some angular deviation of the trailer (108) relative to the illustrated orientation (e.g. up to about 30 degrees) can be accommodated by the conveyor hoppers (42) being independently moveable from their retracted positions to their extended positions, and pivotable between their first and second orientations. The hydraulic cylinder (56) or roller chain drive (58) is actuated to move each of the conveyor hoppers (42) from their retracted position (as shown in FIG. 2) to the extended position (as shown in FIGS. 3 and 4), where each conveyor hopper (42) is positioned beneath a different one of the discharge chutes (110a, 110b). If necessary, the transverse and vertical positions of the conveyor hoppers (42a, 42b) may be independently adjusted (e.g., using hydraulically actuated arms (44a, 44b)) to more precisely position the conveyor hoppers (42a, 42b) beneath and vertically close to the discharge chutes (110a, 110b). The doors associated with the discharge chutes (110) are opened to allow particulate material to flow from the trailer (108) into the conveyor hopper (42). The flighted augers of the conveyors (40) are rotated to transfer particulate material from the conveyor hoppers (42) to the discharge ends (44) that reside in communication with the feed auger hopper (106). Preferably, the speed of the conveyors (40) is controlled to match the feed rate of the swing auger (100). The swing auger (100) transfers the particulate material from the feed auger hopper (106) to the top door of the silo (114). Once the trailer (108) has been fully discharged of particulate material and the conveyors (40) are moved to their retracted positions, the semi-truck can drive the trailer (108) forward or backward. In instances where the semi-truck is towing two trailers in tandem (e.g., in a Super-B configuration), the semi-truck may tow the rear "pup" trailer into position for unloading, and then reverse the front "lead" trailer into position so that the above unloading process can be repeated, or vice versa. In low traction ground conditions, it may be preferable to unload the rear trailer before unloading the front trailer, to maintain weight distribution on the drive wheels of the semi-truck.

In other exemplary uses, the apparatus (10) may be used to unload particulate material from the discharge chute of a source receptacle other than a trailer, and the swing auger may be used to transport the particulate material to a destination receptacle other than a silo. For example, the apparatus (10) may be used to unload grain from the bottom discharge chute of a hopper bin, and the swing auger may be used to transport the particulate material to a trailer. While the example shown in FIGS. 1 through 4 features two conveyors for use with a dual-discharge trailer or other dual-discharge supply source, a single-conveyor variant may be used, whether to service a single-discharge source receptacle or to service multiple discharges of a multi-discharge source receptacle one at a time. Likewise, multi-conveyor versions of the embodiment may have more than two conveyors to service a source receptable having more than two discharges. In any instance, whether the unloading apparatus has one conveyor or multiple conveyors, the benefit of having a conveyor length greater than the tractor length so as to reach from the feed auger of the swing auger longitudinally forward past the front end of the tractor is beneficial to enable unloading of a trailer parked in front of the tractor in transverse orientation, thus providing improvement to the conventional trailer unloading process described in the background. While particularly beneficial for unloading of trailers in this manner, the same process may of course be employed to unload other types of source receptacle similarly positioned in front of the tractor and the wheeled frame of the apparatus.

Figure 5:
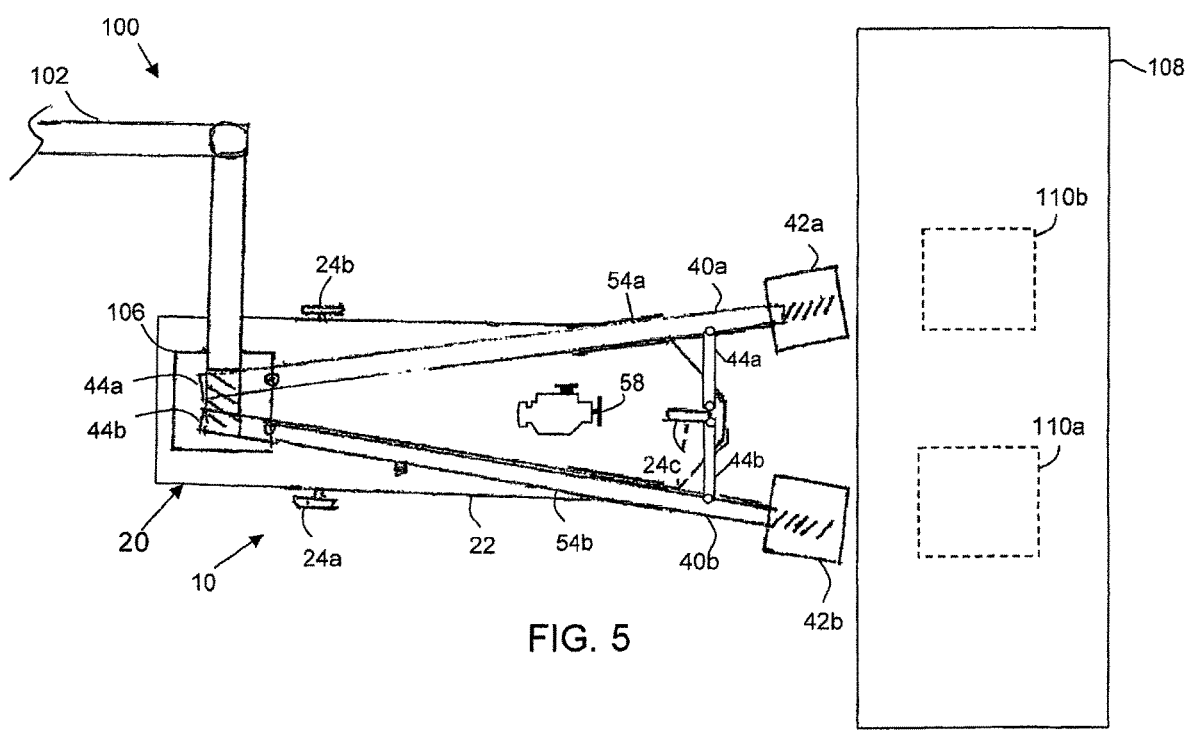
FIG. 5 shows a top plan view of a second embodiment of an apparatus according to the present invention, in relation to a swing auger, when the apparatus is in a retracted position.

FIG. 5 shows a second embodiment of an apparatus (10) according to the present invention that is similar to the first embodiment shown in FIGS. 2 to 4. As such, this embodiment of the apparatus (10), and its use and operation, are described in respect to their differences from the embodiment of the apparatus (10) of FIGS. 2 to 4. In the embodiment of FIG. 5, the wheeled frame (20) does not rely on attachment to a tractor (112) for movement. Instead, the apparatus (10) includes a prime mover (58) onboard the wheeled frame (20) and in driving engagement with its wheels (24) to move the wheeled frame (20) over the ground. As a non-limiting example, the prime mover (58) may be an internal combustion engine that drives hydrostatic pumps, which are coupled to hydraulic motors that drive the wheels (24) of the wheeled frame (20). A steering mechanism may also be provided for maneuvering the wheeled frame (20). Controls for the prime mover (58) and the steering mechanism are provided onboard the wheeled frame (20) for maneuvering the wheeled frame (20). These controls may be actuated by vehicle interfaces (e.g., steering wheel, accelerator pedal, brake pedal) onboard the wheeled frame (20), via a remote radio control, or be controlled autonomously by a computer system to position the wheeled frame (20). The second embodiment is thus of a self-conveying configuration movable independently of a tractor or other external locomotion source. Furthermore, the feed auger hopper (106) may be mounted on and supported by the wheeled frame (20). The steps for unloading particulate material from the trailer (108) to the feed auger hopper (106) are the same as those for the embodiment shown in FIGS. 2 to 4, except that the apparatus is maneuverable independently of the tractor, and the swing auger (100) as a whole may be towed by the apparatus (10) rather than a tractor (112).

Figure 6:
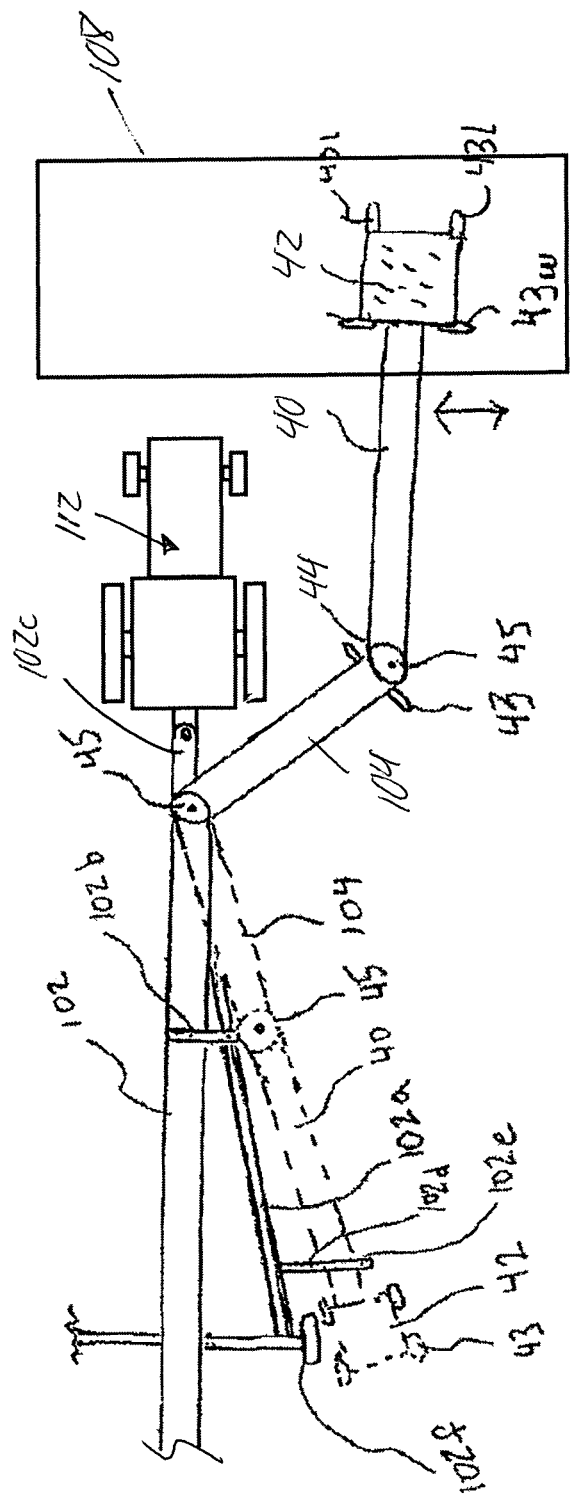
FIG. 6 shows a top plan view of a third embodiment of an apparatus according to the present invention, when the apparatus is in a working position.
Figure 7A:
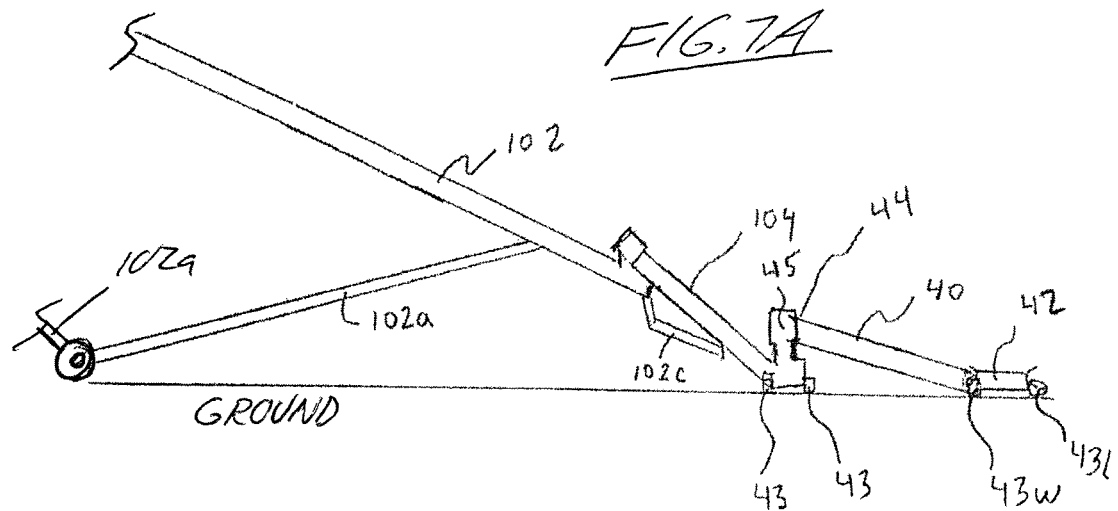
FIG. 7A shows a side elevation view of the apparatus of FIG. 6.
Figure 7B:
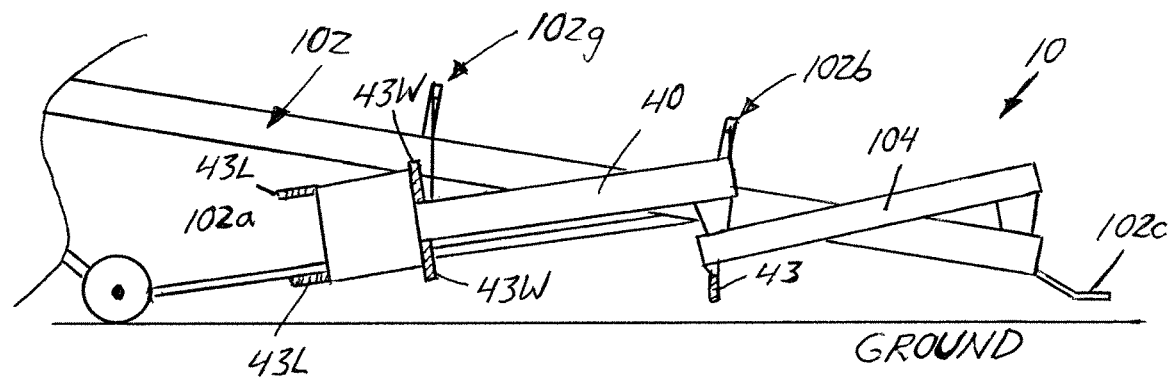
FIG. 7B shows a side elevation view of the apparatus of FIG. 7A, when the apparatus is in a transport position.
Figure 8A:
FIG. 8A shows a side perspective view of a conventional vertical drive of a swing auger assembly.
Figure 8B:
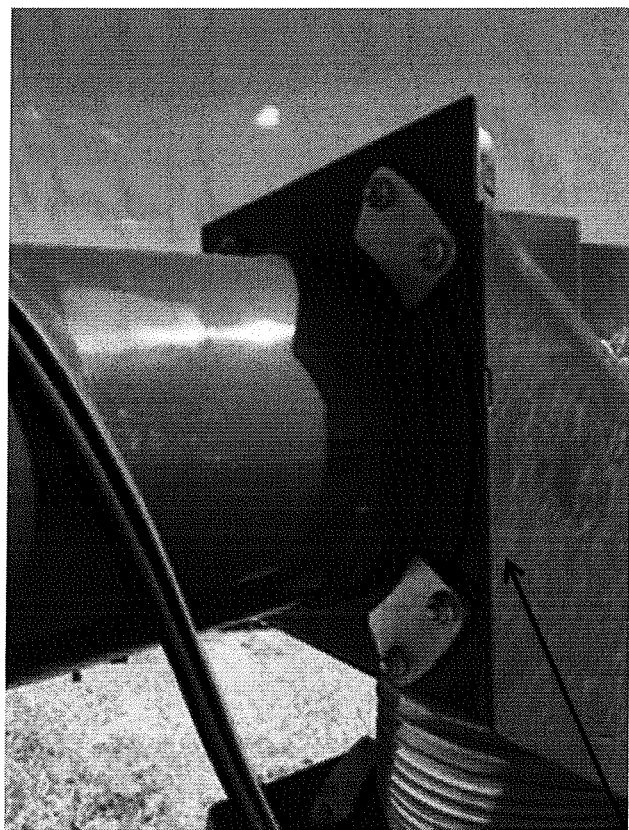
FIG. 8B shows a side perspective view of the conventional vertical drive of FIG. 8A.
Figure 8C:
FIG. 8C shows a side elevation view of the conventional vertical drive of FIG. 8A.

FIGS. 6, 7A and 7B show a third embodiment of an apparatus (10) according to the present invention. As such, this embodiment of the apparatus (10), and its use and operation, is described in respect to its differences from the embodiments of the apparatus (10) of FIGS. 2 to 5.

In the embodiment of FIGS. 6, 7A and 7B, the apparatus (10) does not rely on a wheeled frame to support the conveyor (40) from therebeneath. Instead, the apparatus (10) includes a first set of motorized driven wheels (43) installed on the feed auger (104) of the swing auger, which lacks the feed auger hopper that would conventionally be attached thereto, and instead has the conveyor (40) pivotally coupled to the swing feed auger. In addition to the first set of driven wheels (43) on the feed auger (104), at least one additional set of driven wheels (431, 43w) are provided on the conveyor hopper (42), by which the conveyor (40) can be repositioned and reoriented relative to the swing auger. Controls for operating the motorized driven wheels (43) may be located on the feed auger (104) or any other suitable location.

As shown in FIGS. 6, 7A and 7B, the one conveyor (40) has a hopper (42) attached to one of its ends, which once again may be referred to as the conveyor hopper (42), though in this embodiment, where the feed auger has no respective hopper, no such distinction is required to differentiate between different hoppers. The hopper (42) of the illustrated example has two sets of motorized driven wheels (431, 43w) allowing the hopper (42) to be driven to a desired location. Preferably, the wheels (43) are hydraulically driven. Each of the hopper's two driven wheel sets is installed at or adjacent a respective end of the hopper, and is operable to displace the hopper over the ground in a respective one of two orthogonal directions. That is, the rotational axes of one set of wheels are perpendicular to the rotational axes of the other set of wheels. The hopper (42) comprises a tilt mechanism operable to lift and lower each end of the hopper relative to the other. In one tilted position of the hopper, one set of hopper wheels (43w) engage the ground for lateral movement of the hopper 42 (i.e., for sideways movement in a direction that is perpendicularly transverse to a lengthwise axis of the conveyor in a horizontal reference plane), while in another tilted position of the hopper, the other set of hopper wheels (431) engage the ground for axial movement of the hopper (i.e., for pushing and pulling of the hopper in an axial direction that is parallel to the lengthwise conveyor axis in the horizontal reference plane). Such hopper tilt mechanisms are known to those skilled in art. The driven hopper wheels are thus operable to reposition the conveyor (40) relative to the swing auger and tractor (112) to assist in positioning the hopper (42) underneath a discharge chute of a trailer or other source receptacle. For convenience, controls for operating the motorized driven wheels (43) may be located on the feed auger (104) which is further described below.

The conveyor (40) is not configured to discharge particulate material to a feed hopper communicating with the discharge end (44) of the conveyor (40). Instead, the conveyor discharge end (44) is connected to an inlet end of the feed auger (104) via a vertical gear drive (45), similar to those typically employed for connecting the main auger (102) to the feed auger (104). Examples of such vertical gear drives are employed in swing auger assembles sold by Farm King (https://www.farm-king.com/) and typically comprise a lower gearbox and an upper gearbox connected by a vertical drive-shaft. In a conventional swing auger, the lower gearbox is installed at the inlet end of the main auger, and the upper gearbox is installed at the discharge end of the feed auger that overlies the inlet end of the main auger. The vertical drive allows the feed auger to pivot relative to the main auger about both an upright axis and horizontal axis, while rotatably interconnecting the flighted augers inside the auger tubes of the feed and main augers, and allowing particulate material to fall gravitationally into the inlet end of the main auger from the overlying discharge end of the feed auger.

The vertical gear drive (45) used between the conveyor (40) and feed auger (104) in the present embodiment is installed and operates in the same way to allow particulate material at the discharge end (44) of the conveyor (40) to be moved by gravitational fall from the conveyor's discharge end (44) into the inlet end of the feed auger (104), while also allowing rotation of the conveyor (40) about both an upright axis and a horizontal axis relative to the feed auger (104), thereby allowing the conveyor (40), and attached hopper (42) to be positioned in numerous angled orientations relative to the feed auger (104). In the illustrated embodiment, the conveyor (40) is an auger, and therefore has a flighted auger shaft inside a tubular housing of the conveyor, just like the feed auger and main auger, and so the vertical gear drive rotationally interconnects the flighted auger shafts inside the conveyor (40) and the feed auger (104) for rotation with one another, in the same way the other vertical drive rotationally interconnects the flighted auger shafts of the main and feed augers for shared driven rotation thereof by a shared drive source, for example a power take-off shaft driving the main auger from the tractor (112).

As mentioned above, one set of motorized driven wheels (43) are provided on the feed auger at or near the inlet end thereof at which the vertical gear drive (45) connects the conveyor discharge end (44) to the feed auger (104). These wheels (43) have their rotational axes situated parallel to the axis of the feed auger in a horizontal reference plane, whereby driven rotation of these wheels (43) swings the feed auger side-to-side about its pivotal connection to the main auger during driven rolling contact of the wheels (43) with the ground, thus operating similar to the set of hopper wheels (43w) employed for side to side movement of the conveyor hopper (42). Since the conveyor (40) is connected to the inlet end of the feed auger (104), the driven wheels (43) on the feed auger (104) also contribute to positioning of the conveyor (40) and attached hopper (42) to a desired location. Means for operating such wheels (43) would be apparent to those skilled in the art.

As shown in FIGS. 6, 7A and 7B the conveyor (40) can be positioned in and moved between a working position and a transport position (the latter shown with dashed lines in FIG. 6, and in FIG. 7B). In the working position, shown in FIG. 6, the conveyor (40) and the feed auger (104) are extended out relative to the main auger (102) and positioned similarly to the feed auger and conveyors in the first and second embodiments, such that the hopper (42) is underneath a discharge chute of a trailer or other source receptacle situated in front of the tractor (112). That is, the feed auger (104) is situated in a working position reaching laterally outward from the main auger (102) to one side of the tractor (112), where the conveyor (40) reaches longitudinally forward from the feed conveyor (104) past the front end of the tractor (112) to underlie the bottom discharge chute of a trailer (108) parked in front of the tractor in a transverse orientation relative thereto. The conveyor (40) may be long as, or longer than, the tractor (112) with which it is used in order to ensure sufficient forward reach beyond the front end of the tractor (112).

From the forgoing, it will be appreciated that one way in which the third embodiment differs from the first and second embodiments is that instead of a standalone unloading apparatus with one or more conveyors usable with a separate swing auger of conventional construction, the third embodiment incorporates its one conveyor into the swing auger itself, in place of where the feed auger hopper would normally reside, thereby extending the overall range of hopper positionality, which can be particularly useful to enable unloading of a trailer or other source receptacle from in front of, rather than beside, the tractor. Accordingly, the swing auger and the attached conveyor and hopper thus form an overall system or apparatus for unloading and transferring the particular material all the way from the source receptacle to the destination receptacle, unlike the first and second embodiments, where the apparatus was instead an auxiliary accessory to be used in cooperation with a separate swing auger, where the accessory apparatus was responsible only for the initial unloading state from the source receptacle into the separate and independently driven swing auger, which was then responsible for the particular materials ongoing transfer into the destination receptacle.

As shown in FIG. 6 (in dashed lines) and in FIG. 7b (in solid lines), the conveyor (40) and the feed auger (104) can be moved to the transport position from the working position by actuating the motorized driven wheels (43, 43w) that pivot the conveyor (40) and feed auger (104) about the vertical gear drives (45) that connect the main auger (102) to the feed auger (104) and the conveyor (40) to the feed auger (104). In the transport position, the conveyor (40) and the feed auger (104) span longitudinally rearward from the feed auger's vertical drive connection to the main auger, thus reaching toward the rear discharge end of the main auger along a respective side of the main auger frame. This provides longitudinal compactness to the overall system or apparatus when the feed auger (104) and conveyor (40) are in the transport position, as no part of the feed auger (104), conveyor (40) or hopper (42) reaches forwardly past the vertical drive unit (45) at the inlet end of the main auger (102). The only components of the overall apparatus that span forwardly from the inlet end of the main auger (102) is the main auger's hitch connector (102c) and the power take-off shaft (not shown) by which the main auger is driven, along with the feed auger and conveyor drivingly linked to the main auger (102) via the two vertical drives (45). By storing both the feed auger (104) and the conveyor (40) in a rearwardly-reaching orientation tucked closely alongside the main auger (102), the distance from the inlet end of the main auger (102) to the hitch point of the hitch connector (102c) can be kept small, for example at a length less than the individual lengths of both the feed auger (104) and the conveyor (40), thereby minimizing the longitudinal footprint of the overall apparatus. While the conveyor (40) and the feed auger (104) are moved from their deployed working positions back towards the main auger (102) and main auger frame (102a) for storage, they can be lifted off the ground into the transport position by a lifting means.

The lifting means may comprise a first winch (102b) or alternative means attached to the main auger (102) for lifting the feed auger (104) and conveyor (40) into a transport position in the vicinity where they connect to each other. Such winch-based lifting means are similar to those typically employed for lifting a feed auger of a conventional swing auger assembly off the ground.

As shown in FIG. 7b, the conveyor (40) may also be lifted by a second winch (102g) attached to the main auger (102) at a position spaced therealong from the first winch (102b) by a distance falling within a combined length of the conveyor (40) and hopper (42) while in the transport position. The second winch (102g) may be positioned to correspond to the position of the hopper (42) while in the transport position. Preferably, the hopper (42) is able to rotate about a lengthwise axis thereof into laterally-opening orientation, rather than its normal upwardly-opening orientation, while in the transport position, to prevent snow and rain from entering the hopper opening. A lift cable of the second winch (102g) may be attached to the hopper for rotating the hopper approximately 90 degrees about the hopper's lengthwise axis between these two orientations. Rotation of the hopper (42) is achieved as the vertical gear drive (45) allows for vertical and horizontal rotation of the conveyor (40) relative to the feed auger (104).

As shown schematically in FIG. 6, the lifting means may also or alternatively comprise a lift arm (102d) having a cradle (102e) for holding the conveyor (40) while in the transport position. The lift arm (102d) may be pivotally mounted onto the main auger frame (102a) in the vicinity of the auger frame tires (102f), which are typically located at the pivotal connection between a front section of the main auger frame and a raiseable/lowerable rear section of the main auger frame. Further details of the lift arm (102d) are described with reference to FIGS. 10A and 10B, where the lift arm (102d) doubles as a stabilizer arm (204), described in more detail further below.

Figure 10A:
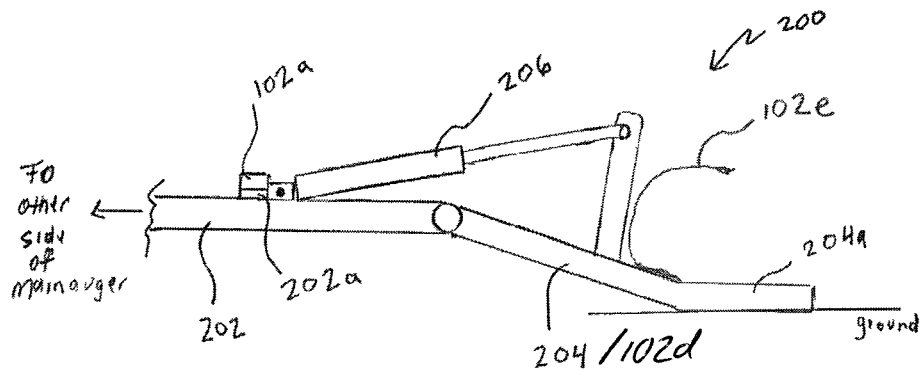
FIG. 10A shows a rear elevation view of a second embodiment of a stabilizing device according to the present invention, in relation to a main auger frame, when the device is engaged with the ground.
Figure 10B:
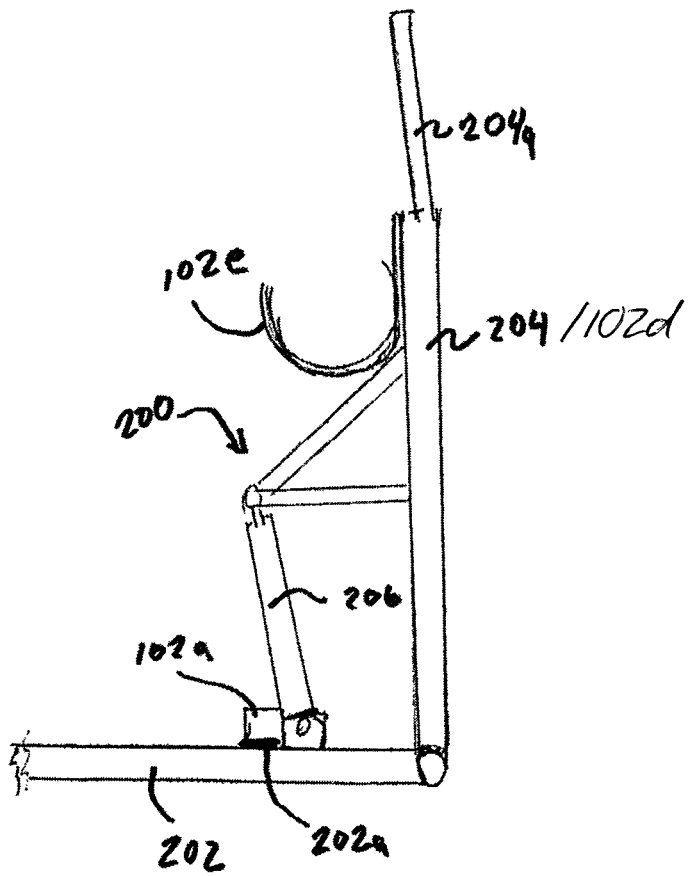
FIG. 10B shows a rear elevation view of the device of FIG. 10A, in relation to a main auger frame, when the device is not engaged with the ground.

In transition of the conveyor (40) and attached hopper (42) into the transport position, the lift arm is placed in a lowered position seated at ground level, in which the open side of the cradle faces transversely outward from the frame of the main auger, as shown in FIG. 10A. The conveyor (40) is moved into the cradle (102e) through operation of the drive wheels (43) on the feed auger and the laterally-driving wheels (43w) on the hopper (42) to drive the feed auger and conveyor transversely inward toward the main auger frame (102a). Once the conveyor is received inside the cradle (102e), the lift arm (102d) is actuated in an upward manner to lift the conveyor (40), and its attached hopper (42) and wheels (431, 43w) up off the ground. FIG. 10A shows the lift arm in its lowered position engaged with the ground, and FIG. 10B shows the lift arm in its raised position for holding the conveyor (40) and attached hopper (42) in an elevated state in the transport position. The lift arm (102d) may be actuated by numerous means known to those skilled in the art, such as, but not limited to, a hydraulic cylinder (206), as described in more detail below in relation to the additional stabilization function of the lift arm (102d). Preferably, the cradle (102e) has enough space inside it to allow the conveyor (40) to slide inside the cradle (102e) as the main auger frame (102a) is manipulated to raise or lower the main auger (102) via raising or lowering of the rear section of the main auger frame (102a).

Figure 11:
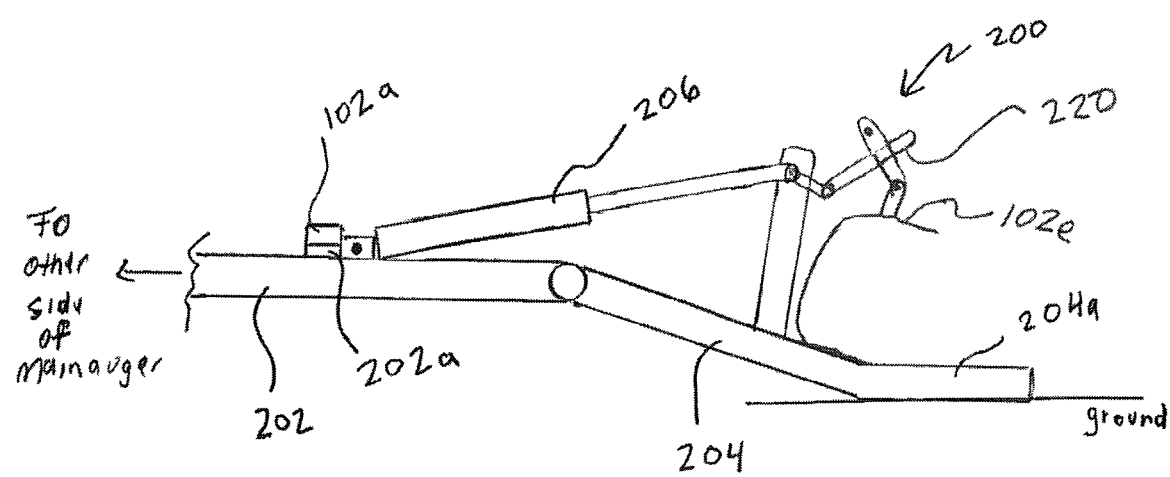
FIG. 11 shows a rear elevation view of a third embodiment of a stabilizing device according to the present invention, in relation to a main auger frame, when the device is engaged with the ground.

A compression lever (220) may be provided (shown in FIG. 11) for compressing the cradle (102e) while the conveyor (40) is positioned inside the cradle (102e). In such embodiments, the cradle (102e) should be composed of a resiliently flexible material. Preferably, when the cradle (102e) is temporarily compressed by the lever (220), the conveyor (40) is locked inside the cradle (102e) in an orientation that minimizes entry of snow and rain to enter the top of the hopper (42) while in the transport position, such as the laterally-opening orientation described above.

As mentioned above, in some exemplary embodiments, the lift arm (102d) may also be employed as a stabilizing device (200) for stabilizing the main auger frame (102a). It is known to those skilled in the art that high winds and/or ground surface contours can destabilize a swing auger as the main auger of the swing auger is elevated upwards into a working position. There is also a danger that the main auger can be blown over by strong winds due to a lack of stability. According to an additional aspect of the present invention, there is therefore provided a stabilizing device (200) for stabilizing the main auger (102) and main auger frame (102a).

As shown in FIGS. 9A to 9D, the device (200) comprises at least one stabilizing arm (204) that is pivotably attached to a stabilizing frame (202) mounted on the main auger frame (102a) such that the least one stabilizing arm (204) is configured to selectively engage with the ground, thereby enhancing the stability of the main auger frame (102a). The device also comprises means for selectively disengaging the at least one stabilizing arm from (i.e., lifting off) and engaging the at least one stabilizing arm (i.e., pressing downwardly on) with the ground. Preferably, the device is mounted in the vicinity of the auger frame tires (102f).

Figure 9A:
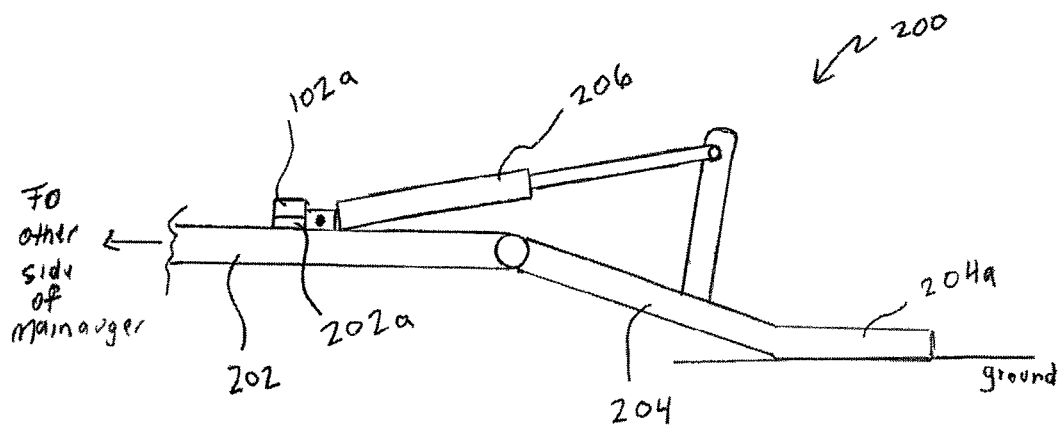
FIG. 9A shows a rear elevation view of a first embodiment of a stabilizing device according to the present invention, in relation to a main auger frame, when the device is engaged with the ground.
Figure 9B:
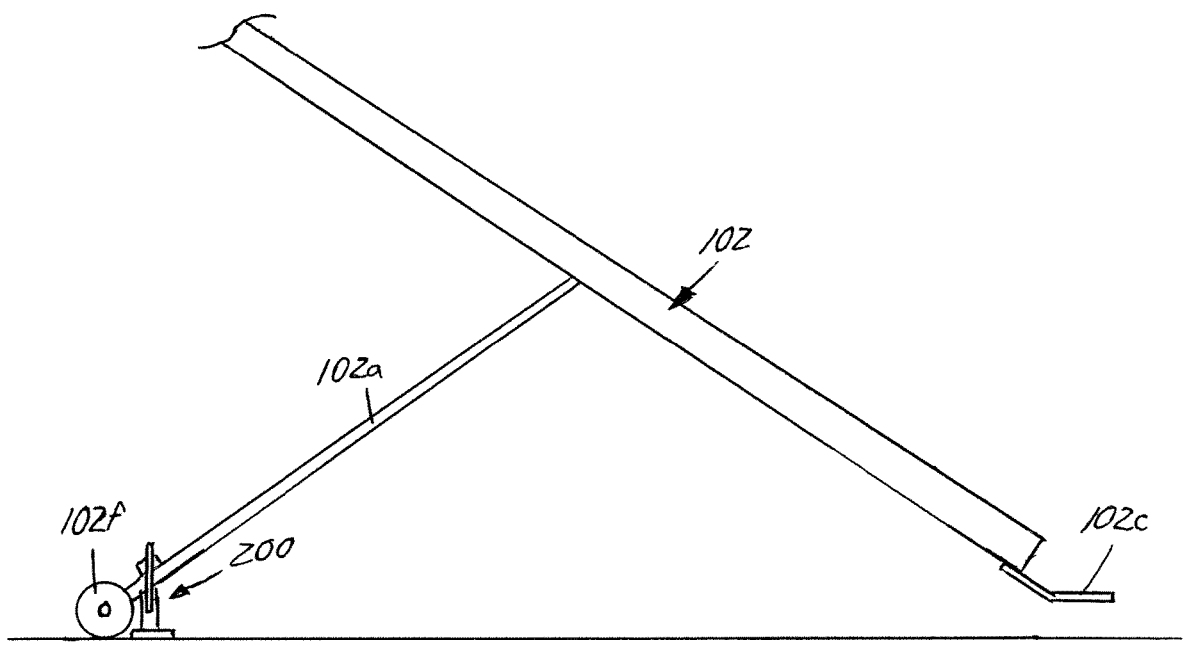
FIG. 9B shows a side elevation view of the device of FIG. 9A, in relation to a main auger frame, when the device is engaged with the ground.
Figure 9C:
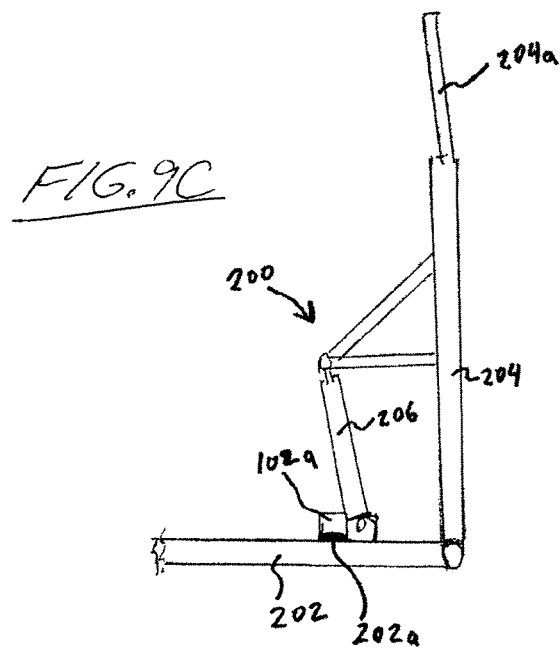
FIG. 9C shows a rear elevation view of the device of FIG. 9A, in relation to a main auger frame, when the device is not engaged with the ground.
Figure 9D:
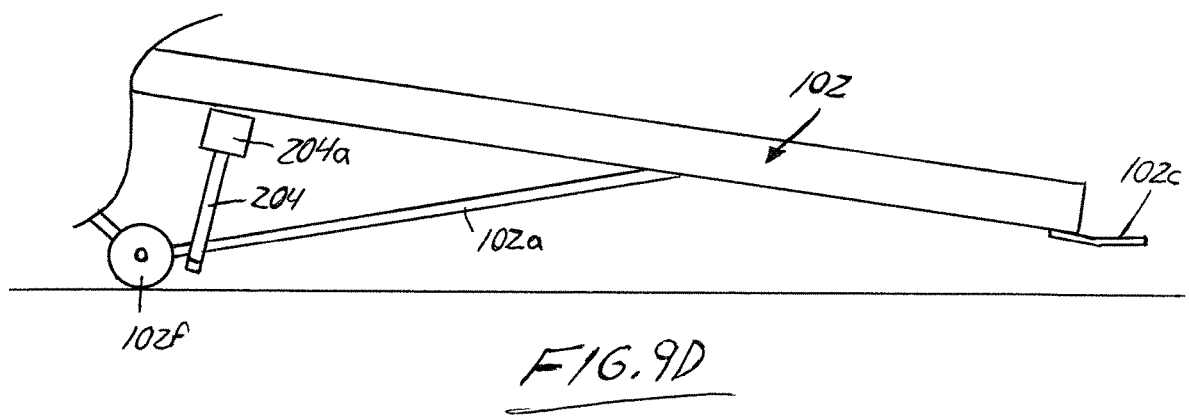
FIG. 9D shows a side elevation view of the device of FIG. 9A, in relation to a main auger frame, when the device is not engaged with the ground.

As shown in FIGS. 9A and 9B, the at least one stabilizing arm (204) is engageable with the ground, allowing the main auger frame (102a) to be leveled or positioned as desired. FIGS. 9C and 9D show the at least one stabilizing arm (204) raised off the ground thereby disengaging the device (200) from the ground allowing the main auger frame (102a) to be transported.

A stabilizing frame (202) is provided that is mounted underneath the main auger frame (102a) in the vicinity of the auger frame tires (102f). Angled shim members (202a) may be provided as necessary between the stabilizing frame (202) and the main auger frame (102a) to compensate for angular changes occurring as the main auger frame (102a) is manipulated to raise or lower the main auger (102). The stabilizing frame (202) may run across and be mounted to both sides of the main auger frame (102a), or be mounted only to one side of the main auger frame (102a). A stabilizing arm (204) is provided that is pivotably attached to the stabilizing frame (202) for pivotal movement of the arm (204) about a longitudinal axis so that the arm (204) spans transversely outward from the main auger frame when lowered into engagement with the ground. Numerous means for pivotably attaching the stabilizing arm (204) to the stabilizing frame (202) would be known to those skilled in the art. For example, a bearing may be employed for attaching the stabilizing arm (204) to the stabilizing frame (202). The stabilizing arm (204) shown in the drawings comprises a flat portion (204a) for engaging with the ground. This flat portion (204a) resides at a distal end of the arm furthest from the arm's pivotal connection to the stabilizing frame, and angularly deviates from the rest of the arm so as to lay more level with the ground than the remainder of the arm that slopes upwardly to its pivotal connection with the stabilizing frame. The flat portion (204a) may also be configured to allow a weighted member, such as a vehicle, to lay on top of it, thereby increasing the stability of the main auger frame (102a). To enable easy driving of a vehicle wheel onto it, the flat portion (204a) may also be thinner than the remainder of the arm.

A hydraulic cylinder (206) has one end pivotally attached to the stabilizing frame (202), and an opposing end pivotally attached to a linkage member that is attached to the stabilizing arm (204) to stand upright therefrom when the arm is in the lowered ground-engaging position. They hydraulic cylinder (206) is thus employed for selectively disengaging the stabilizing arm (204) from, and engaging the stabilizing arm (204) with, the ground. That is, extension of the cylinder (206) pivots the at in (204) downward into engaged contact with the ground, as shown in FIG. 9A, while collapse of the cylinder in the reverse stroke lifts the arm upward out of engagement with the ground, and into a stowed position standing upward from the stabilizer frame, as shown in FIG. 9B. Controls for operating the hydraulic cylinder (206) may be located on a feed auger (104), the tractor (112) employed for moving the auger assembly, or any other suitable location.

As discussed above, the stabilizing frame (202) may run laterally across and be mounted to both sides of the auger frame (102a) or alternatively, a separate stabilizing frame (202) may be mounted to each sides of the auger frame (102a). In such cases, a stabilizing arm (204) can be pivotally attached to each stabilizing frame (202) on both sides of the main auger frame, wherein at least one hydraulic cylinder (206) is employed for selectively disengaging the stabilizing arms (204) from, and engaging the stabilizing arm (204) with, the ground.

It should be noted that as the stabilizing at in (204) engages and is pressed downwardly against the ground, it can assist in tilting the auger frame (102a) and centering the main auger (102) over the silo (114) opening. The amount of tilt will be dictated by the amount of force exerted by each hydraulic cylinder (206).

In some exemplary embodiments, the stabilizing arm (204) is a stabilizing lift arm (204/102d) that comprises a cradle 102e (as shown in FIGS. 10A and 10B), positioned on the stabilizing lift arm (204), for holding a conveyor (40) in the same manner described above for the third embodiment of the unloading apparatus.

Figure 12A:
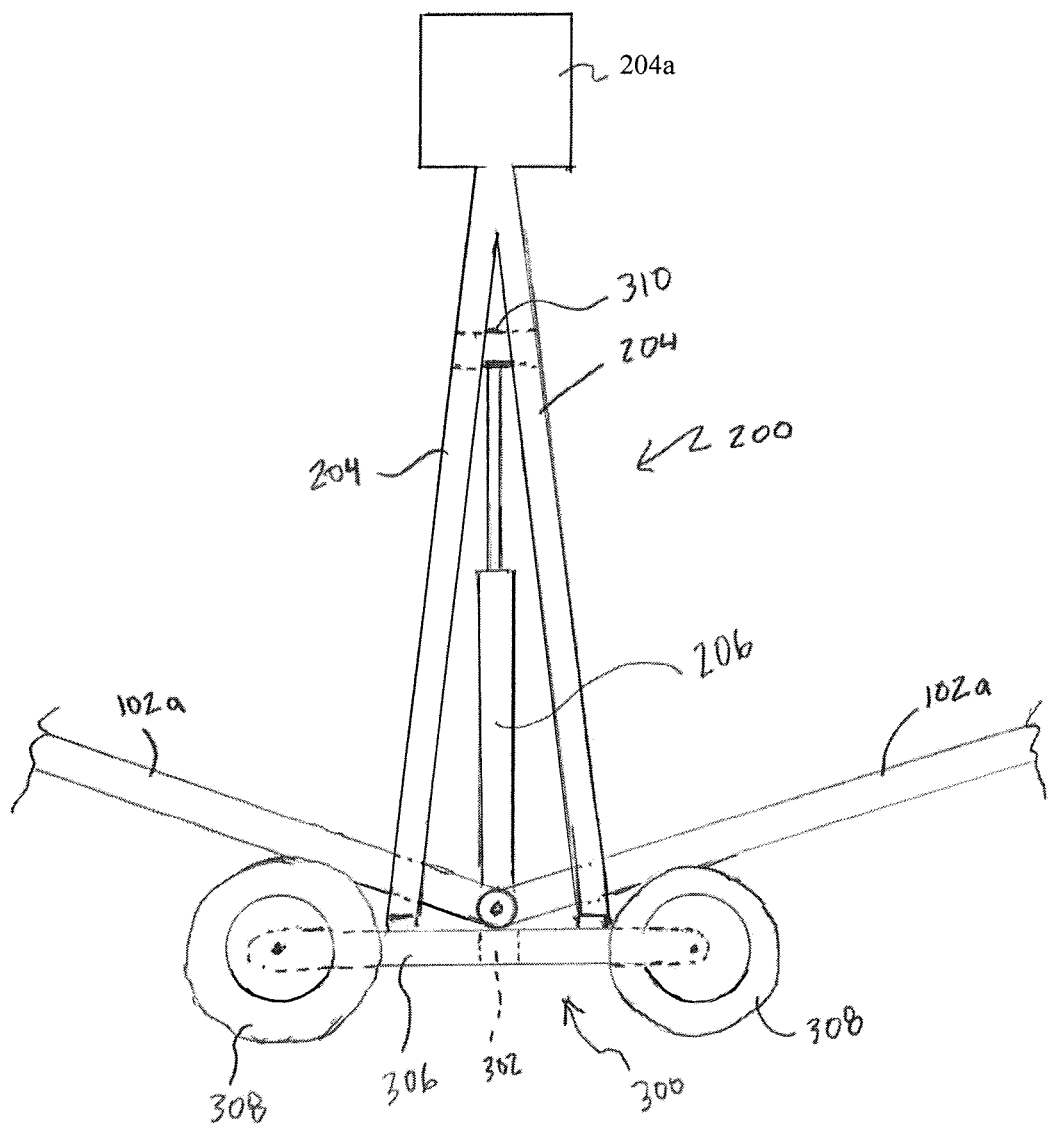
FIG. 12A shows a side elevation view of an embodiment of an axle assembly according to the present invention, in relation to a main auger frame, when a stabilizing device of the present invention mounted on the axle assembly is not engaged with the ground.
Figure 12B:
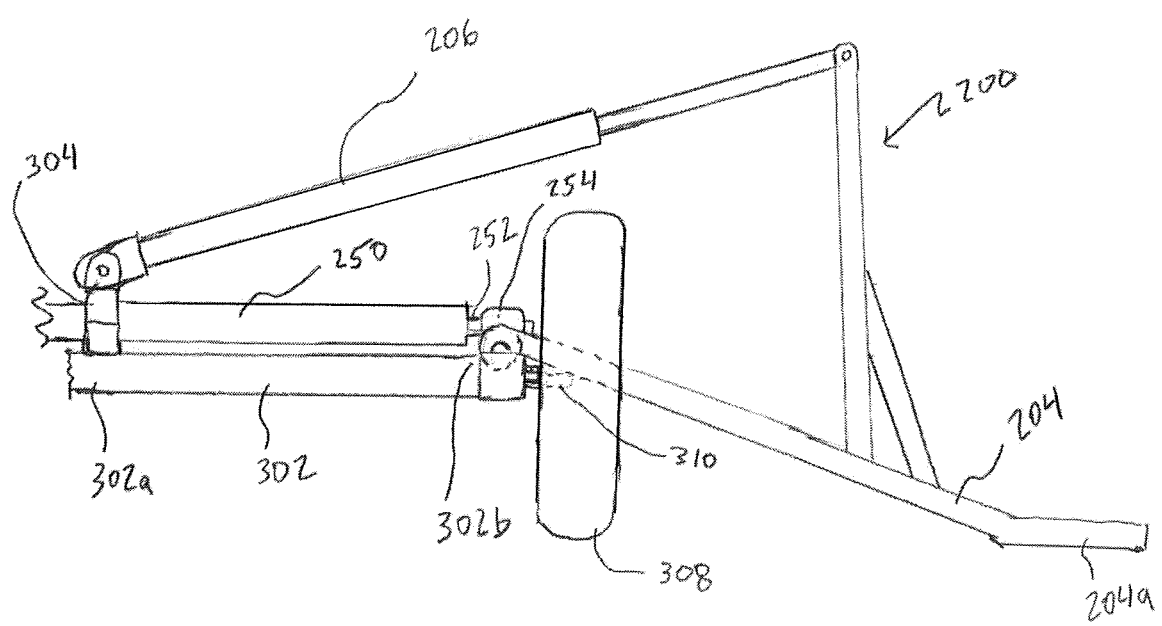
FIG. 12B shows a rear elevation view of the assembly of FIG. 12A, in relation to a main auger axle, when the stabilizing device is engaged with the ground.

In some exemplary embodiments, instead of being attached to the main auger frame, the stabilizing device (200) is instead attached to an oscillating tandem axle assembly (300), as shown in FIGS. 12A and 12B. This allows the stabilizing device (200) to be level with the ground irrespective of angular changes that occur between the ground and the main auger frame (102) as the main auger frame (102a) is manipulated to raise or lower the main auger (102). For such embodiments, angled shim members (202a)

are not required. The oscillating tandem axle assembly (300) can replace the conventional tires and hub typically employed on main auger frames.

Referring to FIG. 12B, the axle assembly (300) comprises a half axle (302) having a first end (302*a*) that is pivotably mounted to the existing main axle (250) of a typical auger frame (102*a*) to enable the half axle to swing about the axis of the main axle in a position therebelow. The hydraulic cylinder (206) of the stabilizing device (200) is also pivotably mounted to the main axle (250) and further connected to the half axle (302) via a split bearing assembly (304), thereby allowing the half axle (302) and the hydraulic cylinder (206) to oscillate together in unison about the axis of the existing main axle (250).

The second end (302*b*) of the half axle (302) is pivotably mounted to a spindle (252) of the existing auger frame axle (250) via a bearing (254) or other suitable means known to those skilled in the art, so that via the pivotal suspension of the half axle's two ends, it lies parallel to the main axle in underlying relation thereto.

Referring to FIG. 12A, an oscillating tandem axle (306) is provided in a position lying longitudinally to the main auger frame (102*a*) and perpendicularly to the main axle and half axle, and is connected to the second end (302*b*) of the half axle (302), preferably by a welded connection. A pair of spaced-apart wheels (308) is provided such that each wheel (308) is rotatably mounted to the oscillating tandem axle (306) via axle spindles (310) or other known means. The rotation axes of the wheels (308) are parallel to the half axle.

Still referring to FIG. 12A, the stabilizing device (200) comprises two stabilizing arms (204) that are each pivotably mounted to the oscillating tandem axle (306) for pivotal movement about a shared longitudinal axis, and are spaced apart from each other in the longitudinal direction at the positions where the stabilizing arms (204) attach to the oscillating tandem axle (306). As the stabilizing arms (204) extend out from the oscillating tandem axle (306) they converge to join each other at a distal end connecting to a flat distal portion (204*a*) for engaging with the ground.

The hydraulic cylinder (206), attached to a linkage member that is attached to the stabilizing arms (204) to stand upright therefrom when the aims are in the lowered ground-engaging position, is employed for selectively disengaging the stabilizing arms (204) from, and engaging the stabilizing arms (204) with, the ground, similar to that described above for the other embodiments. The linkage member may be attached to a cross-plate (310) mounted across both stabilizing arms (204).

Referring to FIG. 12A, it can be seen that the main auger frame has a front section reaching forwardly (to the right in the Figure) toward the front inlet end of the main auger from the location of the wheel axle assembly, and rear section reaching upwardly and rearwardly from the location of the wheel axle assembly toward the rear discharge end of the main auger. The front and rear sections are pivotally coupled together where they meet at this location to enable relative pivoting of the frame sections about a transverse axis parallel to the main wheel axle. The rear section is a raiseable/lowerable section that is raiseable to lift the rear discharge end of the main auger, and is lowerable to lower the rear discharge end of the main auger. During such raising and lowering, the angles of the front and rear frame sections change relative to the ground level. The present embodiment compensates for this change in frame orientation by installing the tandem axle assemblies, whose dual-wheel walking beam configuration always lies parallel to the ground to form a suitable support for the stabilizing arms. By contrast, the earlier embodiment lacking the tandem axle assemblies instead used insertion of appropriately angled shims between the main auger frame and the stabilizer frame to provide the necessary angular compensation therebetween according to the angulation of the main auger frame sections at the given working height of the main auger.

FIGS. 13A through 15B show a swing auger according to another embodiment of the present invention, and which differs from conventional swing augers in a novel redesign of its main auger frame (400), including the addition of a pair of rear stabilizer arms to the main auger frame. The main auger frame features a wheeled front section (402) with a front end (402*a*) at or adjacent which the front section (402) is attached to the tube of the main auger (102), and a rear end (402*b*) near which the auger frame tires (102*f*) are rotatably mounted for rolling support of the main auger frame atop the ground. The main auger frame also features a raiseable/lowerable rear section (404), for example of a scissor linkage type having a first subsection (404*a*) with a pivotal connection to the front section (402), for example at or near the rotational axis of the auger frame tires (102*f*), and a second subsection (404*b*) having a pivotal connection (406) to the tube of the main auger (102) at a distance spaced rearwardly therealong from where the front section (402) is pivotally attached thereto. The two subsections (404*a*, 404*b*) of the rear frame section 404 are hinged together at a third pivotal connection (408). The horizontal pivot axes of these three pivotal connections in the rear frame section (404) lie in the transverse direction, parallel to the rotational axis shared by the two auger frame tires (102*f*). A frame-adjusting hydraulic cylinder (410) has its two ends pivotally and respectively coupled to the first and second subsections (404*a*, 404*b*) of the rear frame section (404) so that extension of this hydraulic cylinder (410) increases the angular spacing between the two subsections, thus expanding the rear frame section upwardly, during which the rising second subsection (404*b*) lifts the rear discharge end (102*h*) of the main auger relative to the front inlet end thereof. Retraction of the actuator (410) collapses the rear frame section (404) downward, thus lowering the rear discharge end (102)*h* of the main auger downwardly to minimize the overall height of the auger for storage or transport. FIGS. 13A, 13B, 15A and 15B show the rear frame section in this collapsed/lowered state for storage or transport. FIGS. 14A and 14B show the rear frame section in the expanded/raised state to raise the main auger into an inclined working position for loading a silo or other destination receptacle.

Conventionally, the front end of the front frame section (402) of a main auger frame would be connected to the tube of the main auger at an intermediate distance between the front inlet end of the main auger (102) and the pivot point (406) at which the rear frame section (404) pivotally connects to the tube of the main auger (102). The novel frame design of the present invention instead has the front frame section (402) pivotally coupled to the main auger (102) directly at, or closely adjacent, the front inlet end of the main auger (102). For such purposes, the auger frame (200) of illustrated embodiment features an upright support (412) standing upright from the front end (402*a*) of the front frame section (402) beneath where the feed auger discharges into the inlet of the main auger (102) at the vertical drive (45). In the figures, the feed auger (104), and optional conveyor (40), are omitted for illustrative simplicity. It to this upright support (412) that the main auger (102) is pivotally coupled at connection (414) to allow pivotal movement between the main auger (102) and the front section (402) of the frame (400) about another horizontal and transversely oriented pivot axis.

The novel frame design, since it reaches all the way to the front inlet end of the main auger (102), also differs from conventional frame designs in that the hitch connector (102c) of the auger is attached to the front end (402)a of the wheeled front frame section (402), rather than to the main auger tube. Since the front frame section (402) is pivotally coupled to the main auger (102) at the inlet end thereof, the distance from the inlet end of the main auger (102) to the rotational axis of the auger frame tires (102f) is a fixed distance that does not change with the raised/lowered status of the rear frame section (404) and corresponding raised/lowered status of the main auger (102), unlike prior art scissor lift frames where the auger frame tires shift forwardly toward the inlet end of the main auger (102) during expansion of the scissor-folding rear frame section. Also, because the front frame section (402) connects to the tractor hitch, the front frame section (402) remains at a consistent angle relative to ground level when hitched to the tractor, regardless of the raised/lowered state of the rear frame section and the corresponding inclination angle of the main auger (102).

The front frame section (402) also differs from those of conventional auger frames in that its rear end (402b) is situated rearwardly from the rotational axes of the auger frame tires (102f), and a pair of rear stabilizer arms (416) are movably mounted to the front frame section (402) at or adjacent this rear end (402b). Each of these rear stabilizer arms (416) is mounted to the front frame section at or adjacent a respective rear corner thereof, and is pivotable up and down about a horizontal pivot (418), and is angularly adjustable in a swiveling motion about an upright pivot (420). Like the stabilizer arms described above in earlier embodiments, each rear stabilizer arms (416) is lowerable into pressure-applying engagement with the ground, and raiseable into a disengaged state from the ground, by a respective hydraulic cylinder (422). As shown, each stabilizer arm (416) may once again feature an angularly deviated, flat portion (416) at the distal end thereof for the same purpose described above for the other stabilizer arms.

With reference to FIGS. 13A, 14A and 15A, the hydraulic cylinder (422) responsible for such raising and lowering of each rear stabilizer arm (416) has its upper end pivotally coupled to an upright stanchion (424) that is affixed atop a rotatable base plate (426), which in turn is rotatably pinned to the front frame section by the upright pivot (420). The horizontal pivot (418) of the respective rear stabilizer arm (416) is also mounted on this rotatable base plate. In addition to the first hydraulic cylinder (422) responsible for lifting and lowering, each rear stabilizer arm is also cooperable with a second hydraulic cylinder (428) that has a first end pivotally pinned to the rotatable base plate (426), and a second end pivotally pinned to the front frame section (402 at a distance forwardly of the rotatable base plate (426). The axes of these pivot pins are oriented vertically upright, and parallel to the axis of the upright pivot (420) on which the base plate (426) is rotatable. Extension and collapse of hydraulic cylinder (428) is thus operable to rotate the base plate (426) in opposing directions about the upright pivot (420) in order to swing the respective rear stabilizer arm (416) around the upright axis of this pivot (420). Hydraulic cylinder (422) is therefore used to raise and lower the rear stabilizer arm (416), while hydraulic cylinder (428) is used to swivel the rear stabilizer arm (416) about an upright axis when lifted off the ground in order to change the position at which the arm (416) will engage the ground when lowered back down into engagement therewith by the raising/lowering cylinder (422). In FIGS. 13B, 14B and 15B, the raising/lowering cylinder (422) and associated stanchion (424) are omitted for illustrative simplicity.

FIGS. 13A and 13B show the rear stabilizer arms in rearwardly-reaching positions extending rearwardly and longitudinally outward from the rear end (402b) of the front section (402) of the main auger frame, and lowered into the ground-engaging state. When the auger is disconnected from the tractor and parked for storage, engagement of the ground at a distance rearward from the auger frame tires (102f) serves to brace the rear end of the auger frame up off the ground, and thereby prevent downward tipping of the rear discharge end (102h) of the main auger (102) that otherwise may occur if the weight distribution of the auger is rear-heavy or relatively balanced across the rotational axes of the auger frame tires (102f).

FIGS. 14A and 14B show the rear stabilizer arms after angular repositioning thereof about the upright pivots (420) by extension of the swivel cylinders (428) in order to swivel the rear stabilizer arms (416) ninety degrees from their rearwardly-reaching positions of FIGS. 13A and 13B. Accordingly, the rear stabilizer arms (416) now lie in laterally-reaching positions extending transversely outward from the main auger frame at opposing sides thereof in parallel relation to one another and in perpendicular relation to the longitudinal direction of the main auger. This is useful when the main auger is in, or transitioning into, its inclined working position with the rear discharge end elevated by the raised state of the rear frame section (404) in order to reach the elevated inlet of the silo or other destination receptacle.

In addition to lending stability to the auger in the working position, and optionally during transition thereto, differential operation of the two laterally-reaching stabilizer arms (416) can also be used to help aim the rear discharge end (102h) of the main auger (102) over the elevated inlet of the destination receptacle. That is, the arm raising/lowering cylinders (422) are hydraulically extendable and retractable independently of one another, whereby on flat ground, extension of the raising/lowering cylinder (422) of a first one of the rear stabilizer arm (416) further than the second one will lift the first side of the main auger frame (400) relative to the second side, thus tilting the main auger (102) toward the second side, and thereby shifting the rear discharge end (102h) of the main auger (102) in this direction to achieve better alignment with the elevated inlet of the destination receptacle. Aiming of the discharge end of an auger by tilting of the auger frame to one side or the other, though by notably different means, is described in U.S. Pat. No. 9,932,178, the entirety of which is incorporated herein by reference.

FIGS. 15A and 15B show the rear stabilizer arms deployed into two differently oriented positions around their respective upright pivots (420) so that one rear stabilizer arm (the arm at the top of the figure in the illustrated example) extends forwardly past the shared rotational axis of the auger frame tires (102f) by a notable distance, while the other rear stabilizer arm extends rearwardly from the rear end 402b of the front section (402) of the main auger frame (400). The ability to achieve both rearward and forward reaching orientations may be useful during transition of the auger from a parked storage state to a tractor-hitched state for towing, as user-controlled operation of the differently oriented stabilizer aims (416) can be used to raise and lower the hitch connector (102c) at the front end (402a) of the front frame section (402) to a suitable elevation for connection to the tractor.

For example, if raising of the hitch connector (102) is desired to achieve hitched connection to the tractor, the user employs suitable hydraulic controls connected to the raising/lowering cylinders (422) to lower the distal end of the forwardly-reaching stabilizer arm to the ground at a location spaced forwardly beyond the auger frame tires (102f), and to likewise lower the rearwardly-reaching stabilizer arm into engagement with the ground at a distance behind the auger frame tires (102f). The length of the forwardly-reaching stabilizing arm and the weight distribution of the auger are designed such that the forward-reaching stabilizing arm reaches forwardly past the auger's longitudinal center of mass. With both stabilization arms in contact with the ground, the raising/lowering cylinder of the rearwardly-reaching stabilizing arm is hydraulically locked to hold this arm at fixed relation to the front frame section (402), but the raising/lowering cylinder of the forwardly-reaching stabilizing arm is pressurized in the extending direction to apply down-pressure on the ground at the distal end of the forwardly-reaching stabilizing arm, thereby lifting the front end (402a) of the front frame section (402), and thereby raising the hitch connector (102c) upwardly away from the ground. If the rearwardly extending arm is maintained in a hydraulically locked state during this frame-lifting action of the forwardly-reaching stabilizing arm, then the auger frame tires can be lifted off the ground by this action, as the distal end of the locked rearwardly-extending arm can serve as a rearwardly-shifted fulcrum point about which the front end of the auger frame is lifted. This allows the hitch connector (102c) to be raised to a more elevated height than would be achievable if the rearwardly reaching stabilizing arm was not engaged with the ground and hydraulically locked, in which case the auger frame tires (102f) would remain on the ground and serve as the default fulcrum point. In the latter scenario using the tires (102f) as the fulcrum about which to lift the hitch connector (102c), both rear stabilizing arms (416) may be deployed to the forwardly-reaching positions for use in lifting the front end of the main auger frame about the tire-defined fulcrum point. In either scenario, the forward reaching stabilizer arm(s) enables raising of the front-end hitch connector (102c), even in the event of an auger whose weight distribution is front-heavy across the rotational axis of the auger frame tires (102f).

As shown in FIG. 15B, the forwardly-reaching position may be less than 180-degrees from the rearwardly-reaching position of FIGS. 13A and 13B, which is preferably parallel to the longitudinal direction of the main auger in the horizontal reference plane. In the illustrated example, the forwardly-reaching position is approximately 150-degrees from the longitudinally rearward-reaching position. Accordingly, in instances where one arm is oriented forwardly and the other rearwardly, the rearwardly oriented arm may be oriented in parallel relation to the forwardly oriented arm to help stabilize the auger frame in the transverse direction by having the distal ends of the two arms equidistantly outward from the opposite sides of the auger frame. This is shown in FIG. 15B, where the rearwardly reaching stabilizer arm is swung 30-degrees outward from the longitudinally-rearward orientation of FIG. 13B so as to lie parallel with the 150-degree position of the forwardly reaching arm.

In instances where the auger has a rear-heavy weight distribution across the rotational axis of the auger frame tires (102f), similar differential pressurization of forwardly and rearwardly oriented stabilization arms may be used to lower the hitch connector (102c), which would normally be biased upwardly about the default tire-defined fulcrum point by the rear-heavy weight distribution. In such instance, it is the forwardly reaching stabilizer arm that can optionally be hydraulically locked to serve as a forwardly-shifted fulcrum point about which lifting of the rear end of the auger frame by pressurized ground engagement of the rearwardly reaching stabilizer arm in order can be used to lower the hitch connector at the front end of the auger frame. On the other hand, if lowering of the hitch connector to a suitable hitching elevation can be attained by lifting the rear end of the auger frame about the default tire-defined fulcrum point, then the optional deployment of one of the stabilizing arms to the forward reaching direction can be omitted, and both stabilizing arms may optionally be pressurized in their rearward-reaching positions to cooperatively lift the rear end of the auger frame about the rotational axis of the auger frame tires (102f). The inventive auger frame (400) of FIGS. 13A through 15B may be employed with a swing auger of the type illustrated in FIGS. 6, 7A and 7B with both a feed auger (104) and additional conveyor (40), or a more conventional swing auger with just the feed auger (104) and no additional conveyor (40). The front frame section (402) of the inventive auger frame (400), in addition to the rear stabilizer arms (416) deployable into any one or more of the rearwardly, forwardly and laterally-reaching positions, may additionally feature the lift/stabilizing arms (204) referred to the earlier embodiments, which can be used not only for additional stabilization in the working position of the auger, or during transition thereto, but also for use in lifted storage of the feed auger (104), and optionally attached conveyor (40), onto the font section (402) of the main conveyor frame (400) to prepare the auger for storage or transport. It will be appreciated that since the front frame section (402) of the inventive frame (400) remains parallel to ground regardless of the main auger's degree of inclination, the oscillating tandem wheel assembly or shims of the earlier embodiments are unnecessary.

References in the specification to "one embodiment", "an embodiment", etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such module, aspect, feature, structure, or characteristic with other embodiments, whether or not explicitly described. In other words, any module, element or feature may be combined with any other element or feature in different embodiments, unless there is an obvious or inherent incompatibility, or it is specifically excluded.

It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition or step being referred to is an optional (not required) feature of the invention.

The singular forms "a," "an," and "the" include the plural reference unless the context clearly dictates otherwise. The term "and/or" means any one of the items, any combination of the items, or all of the items with which this term is associated. The phrase "one or more" is readily understood by one of skill in the art, particularly when read in context of its usage.

The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values and ranges proximate to the recited range that are equivalent in terms of the functionality of the composition, or the embodiment.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc.

As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio.

The corresponding structures, materials, acts, and equivalents of all means or steps plus function elements in the claims appended to this specification are intended to include any structure, material, or act for performing the function in combination with other claimed elements as specifically claimed.

The invention claimed is:

1. A system for unloading particulate material from a bottom discharge of a trailer or other source receptacle and transferring said particulate material to a silo or other destination receptacle, said system comprising:
   a tractor;
   a swing auger towable by said tractor at a rear end thereof when in a towable state connected to said rear end of the tractor, and comprising a main auger that is configured to be positionable, while in said towable state, in a working position reaching rearwardly and upwardly from the tractor, and a feed auger that is pivotally coupled to the main auger and configured to be positionable relative thereto, while in said towable state, in a working position spanning transversely outward from said main auger; and
   an unloading apparatus configured for use in a connected state of connected relation to one of either the tractor or the feed auger of the swing auger, and comprising at least one conveyor having a conveyor hopper at one end thereof and a discharge at a second opposing end thereof, said conveyor being configured to be positionable, with the swing and the unloading apparatus in their respective towable and connected states, in a working position running longitudinally of said tractor along on side thereof with the discharge of the conveyor in feeding relation to an input end of the feed auger, and with the conveyor hopper of the conveyor positioned longitudinally forward of the tractor to reside under the bottom discharge of the trailer or other source receptacle.

2. The system of claim 1 wherein the conveyor of said unloading apparatus is of connected relation to the feed auger via a pivotal connection thereto, by which the conveyor can pivot relative to said feed auger.

3. The system of claim 2 wherein the conveyor is an auger and the pivotal connection includes a rotational connection between flighted auger shafts of the conveyor and the feed auger.

4. The system of claim 2 comprising a set of driven wheels on the feed auger at a location at or proximate said pivotal connection between the conveyor and the feed auger.

5. The system of claim 4 further comprising at least one additional set of driven wheels on the conveyor hopper.

6. The system of claim 5 wherein said at least one additional set of driven wheel comprises two additional sets of driven wheels, respectively operable in engagement with the ground to move the conveyor hopper in different respective directions of orthogonal relation to one another.

7. The system of claim 2 wherein the conveyor and the feed auger are positionable, with the unloading apparatus in its connected state, in a transport position reaching longitudinally rearward from where the feed auger connects to the main auger.

8. The system of claim 7 wherein the main auger comprises a frame on which there is carried a cradle for holding the conveyor in the transport position.

9. The system of claim 7 wherein the main auger comprises a frame, and a movable lift arm attached to the frame and movable relative thereto to lift the conveyor into the transport position.

10. The system of claim 9 comprising an actuator coupled to the lift arm and operable to push said lift arm downwardly against the ground for use as a stabilizer arm for stabilizing the frame of the main auger.

11. The system of claim 10 wherein said lift arm comprises a flat portion that angularly deviates from a remainder of the lift am at a distal outer end thereof for engagement with the ground, and for accommodating receipt of a vehicle or other weight source atop said flat portion.

12. The system of claim 10 comprising a second stabilizer arm at a second side of the frame opposite that at which the lift arm is located.

13. An unloading apparatus for unloading particulate material from a bottom discharge of a trailer or other source receptacle and transferring said particulate material to a silo or other destination receptacle, said apparatus comprising:
   a swing auger comprising:
      a main auger extending in a longitudinal direction and connectable to a tractor for towed transport;
      a feed auger pivotably coupled to the main auger; and
      a conveyor pivotally attached to an input end of the feed auger, and extending from a conveyor hopper for receiving particulate material from the discharge chute of the source receptacle, to a discharge end for discharging the particulate material to the feed auger;
   wherein the swing auger is further characterized by inclusion of at least one of the following features:
   (a) differently-oriented drive wheels on the conveyor hopper that are respectively operable in engagement with the ground to move the conveyor hopper in different respective directions of orthogonal relation to one another; and/or
   (b) at least one axial drive wheel on the conveyor hopper that is oriented to drive axial movement of the conveyor hopper in pushing and pulling fashion in an axial direction that is of parallel relation to a lengthwise conveyor axis of the conveyor in a horizontal reference plane.

14. The apparatus of claim 13 characterized by inclusion of feature (a).

15. The apparatus of claim 13 characterized by inclusion of feature (b).

16. The apparatus of claim 13 characterized by inclusion of both features (a) and (b), wherein said differently-oriented drive wheels include said at least one axial drive wheel, and also at least one lateral drive wheel that is oriented differently of said at least one axial drive wheel so as to drive lateral movement of the conveyor hopper in a sideways direction that is of transverse relation to the lengthwise conveyor axis in said horizontal reference plane.

17. An unloading apparatus for unloading particulate material from a bottom discharge of a trailer or other source receptacle and transferring said particulate material to a silo or other destination receptacle, said apparatus comprising:
    a swing auger comprising:
        a main auger extending in a longitudinal direction and connectable to a tractor for towed transport;
        a feed auger pivotably coupled to the main auger; and
        a conveyor pivotally attached to an input end of the feed auger, and extending from a conveyor hopper for receiving particulate material from the discharge chute of the source receptacle, to a discharge end for discharging the particulate material to the feed auger;
    wherein:
    the swing auger is further characterized by arrangement of the conveyor and the feed auger to be positionable in a transport position reaching longitudinally rearward from where the feed auger connects to the main auger; and
    the main auger comprises a frame, and a movable lift arm attached to the frame and movable relative thereto to lift the conveyor into the transport position.

18. The apparatus of claim 17 wherein a distance measured between a point at which the feed auger pivotably connects to the main auger to a point at which the main auger is configured for connection to the tractor is shorter than a length of the feed auger.

19. The apparatus of claim 17 further comprising a stabilizing device comprising at least one stabilizing arm pivotally mounted to the frame in a manner configured for selectively engage with the ground to thereby enhance the stability of the frame, and at least one actuator for selectively lifting the at least one stabilizing arm to a disengaged state from the ground, and forcing the at least one stabilizing arm downwardly against the ground in an engaged state therewith.

20. The apparatus of claim 19 further comprising at least one oscillating tandem axle assembly that is installed on the frame, carries said at least one stabilizing arm thereon, and is operable to enable the stabilizing device to be level with the ground irrespective of angular changes occurring as the frame is manipulated to raise or lower the main auger.

21. The apparatus of claim 17 wherein the frame comprises a wheeled front frame section having auger frame tires rotatably mounted thereon for rolling support of the frame, and a rear frame section movably coupled to the wheeled front frame section and movable from a lowered position to a raised position to transition the main auger between a lowered state for storage and transport, and raised state in which a discharge end of the main auger is elevated to enable discharge into an elevated inlet of a destination receptacle;
    wherein the apparatus is further characterized by one or more of the following features:
        (a) the front frame section is pivotally coupled to the main auger at or closely adjacent a front inlet end thereof;
        (b) the feed auger is pivotally coupled to the main auger, and the front frame section is pivotally coupled to the main auger beneath a location at which the feed auger is coupled thereto;
        (c) the apparatus comprises a hitch connector attached to the front frame section at a front end thereof;
        (d) a distance from the front inlet end of the main auger to the auger frame tires of the wheeled front frame section is a fixed distance that remains static during movement of the rear frame section between raised and lowered positions; and
        (e) the front frame section has rear stabilizer arms that are mounted thereon at or proximate a rear end of said front from section, and are lowerable into pressure-applying engagement with the ground, and raiseable into a disengaged state therefrom.

22. The apparatus of claim 21 characterized by inclusion of feature (a).

23. The apparatus of claim 21 characterized by inclusion of feature (b).

24. The apparatus of claim 21 characterized by inclusion of feature (c).

25. The apparatus of claim 21 characterized by inclusion of feature (d).

26. The apparatus of claim 21 characterized by inclusion of feature (e).

* * * * *